(12) United States Patent
Nakamuta

(10) Patent No.: US 12,468,647 B2
(45) Date of Patent: Nov. 11, 2025

(54) INTERFACE CIRCUIT, DIGITAL CIRCUIT, COMMUNICATION MODULE, AND COMMUNICATION DEVICE

(71) Applicant: Murata Manufacturing Co., Ltd., Kyoto (JP)

(72) Inventor: Kazuhiro Nakamuta, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 17 days.

(21) Appl. No.: 18/584,250

(22) Filed: Feb. 22, 2024

(65) Prior Publication Data

US 2024/0193113 A1 Jun. 13, 2024

Related U.S. Application Data

(63) Continuation of application No. PCT/JP2022/028174, filed on Jul. 20, 2022.

(30) Foreign Application Priority Data

Sep. 3, 2021 (JP) ................................. 2021-144118

(51) Int. Cl.
*G06F 13/38* (2006.01)
(52) U.S. Cl.
CPC .................................... *G06F 13/38* (2013.01)
(58) Field of Classification Search
CPC .................................................... G06F 13/38
See application file for complete search history.

(56) References Cited

U.S. PATENT DOCUMENTS

| 4,479,123 A | 10/1984 | Loskorn et al. |
| 4,598,360 A | 7/1986 | Loskorn |
| 6,604,151 B1 * | 8/2003 | Date ....................... G06F 13/38 710/28 |
| RE49,591 E * | 7/2023 | Kaushik ............... G06F 1/3293 713/320 |

(Continued)

FOREIGN PATENT DOCUMENTS

| JP | H06-110576 A | 4/1994 |
| JP | 2008-077184 A | 4/2008 |
| JP | 2010-244445 A | 10/2010 |

OTHER PUBLICATIONS

International Search Report for PCT/JP2022/028174 dated Oct. 18, 2022.

*Primary Examiner* — Henry Tsai
*Assistant Examiner* — Aurangzeb Hassan
(74) *Attorney, Agent, or Firm* — McDonald Hopkins LLC

(57) ABSTRACT

An interface circuit includes a first storage circuit that holds first timer selection information indicating which of a plurality of timers is to be selected; a second circuit including a first circuit that performs a counter operation, and a register update signal generation circuit that outputs, based on an output of the first circuit, a first register update signal for updating a register, the second circuit being capable of operating as any one of the plurality of timers; and a control circuit that controls, based on the first timer selection information from the first storage circuit and counter identification information that is received from an external device and that indicates any one of a plurality of counters associated with the plurality of timers, whether to enable or disable write to the first circuit or read from the first circuit.

9 Claims, 22 Drawing Sheets

(56) References Cited

U.S. PATENT DOCUMENTS

2006/0245275 A1* 11/2006 Naito ..................... G11C 7/22
                                                      365/191
2017/0223646 A1   8/2017 Romera et al.
2022/0261370 A1*  8/2022 Otsuka .................. G06F 13/38

* cited by examiner

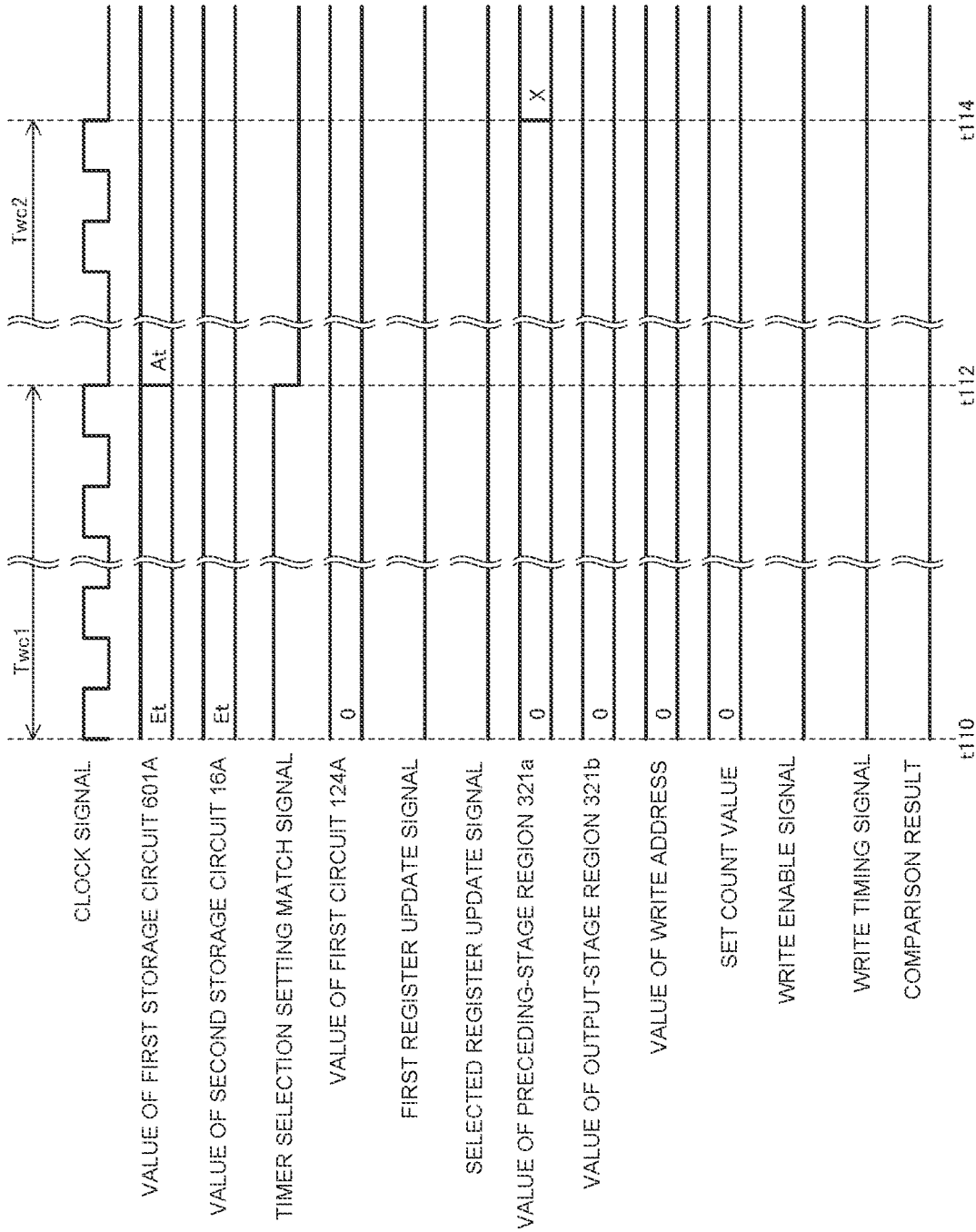

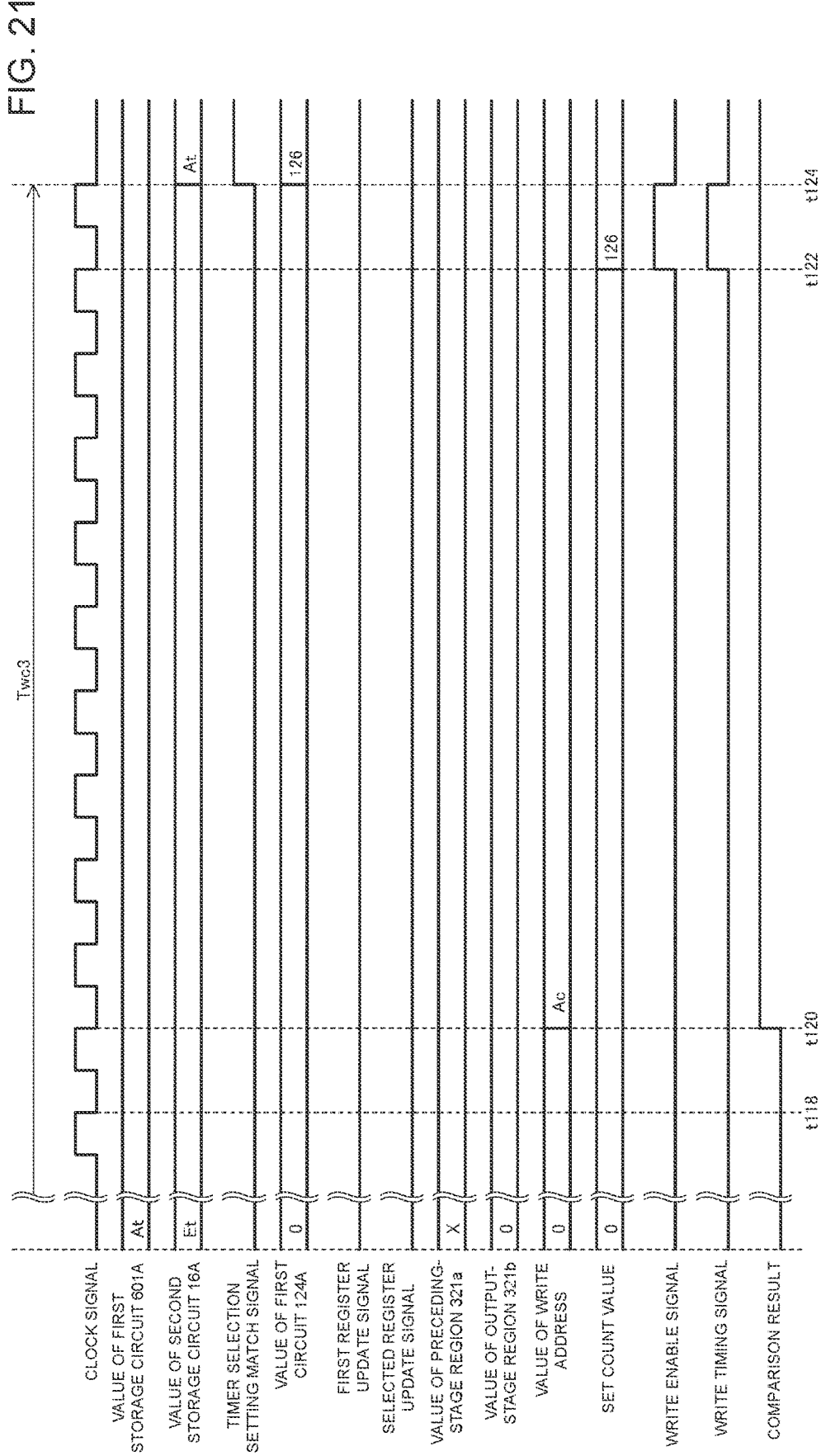

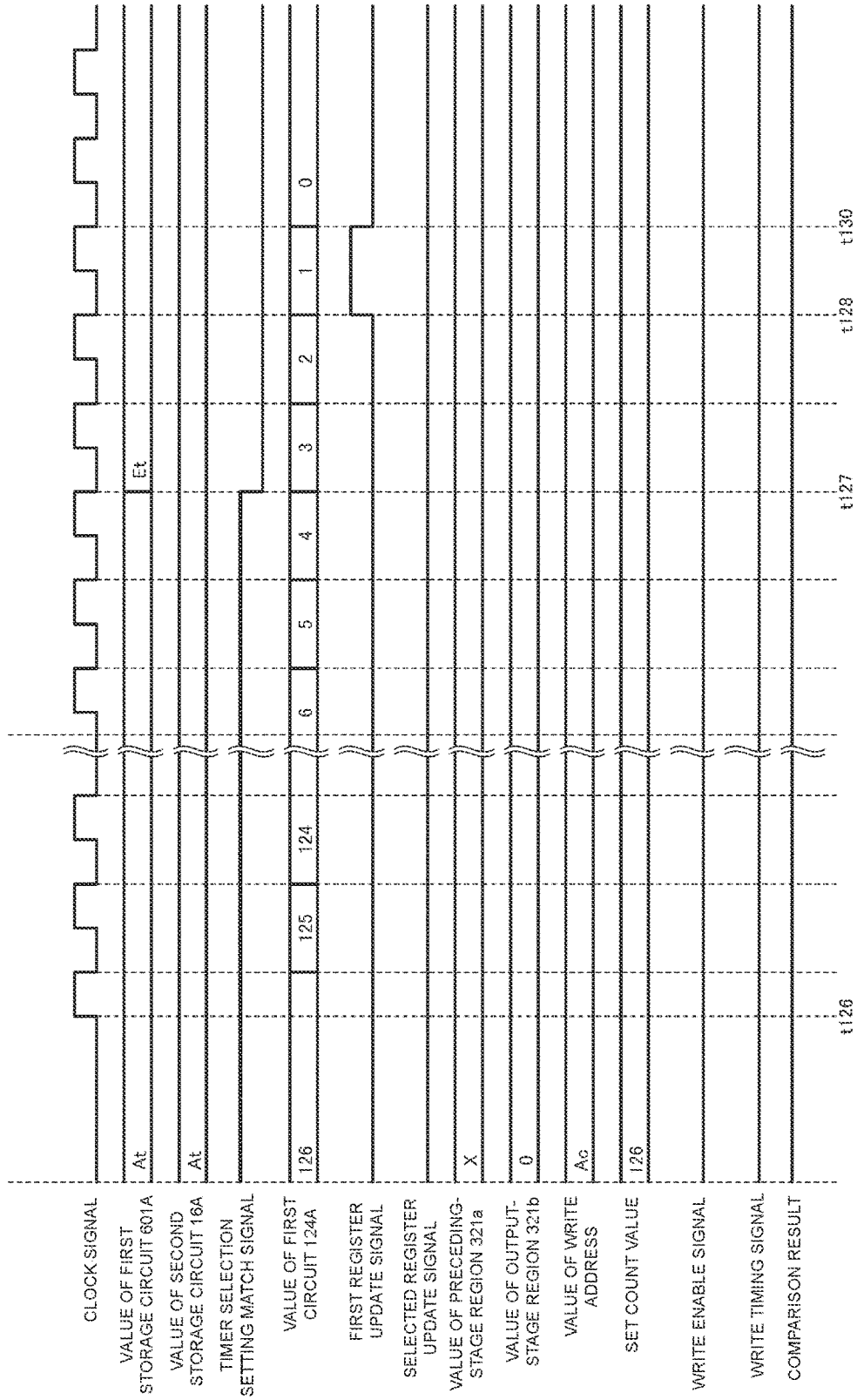

INTERFACE CIRCUIT, DIGITAL CIRCUIT, COMMUNICATION MODULE, AND COMMUNICATION DEVICE

CROSS REFERENCE TO RELATED APPLICATION

This is a continuation of International Application No. PCT/JP2022/028174 filed on Jul. 20, 2022 which claims priority from Japanese Patent Application No. 2021-144118 filed on Sep. 3, 2021. The contents of these applications are incorporated herein by reference in their entireties.

BACKGROUND ART

Technical Field

The present disclosure relates to an interface circuit, a digital circuit, a communication module, and a communication device.

There is a timer device that uses one or more counters for one timer (see, for example, Patent Document 1).

Patent Document 1: United States Patent Application Publication No. 2017/0223646

BRIEF SUMMARY

For example, among timer devices that are controllable by an external device, a general-purpose timer device may include a plurality of timers that are controllable by the external device. Such a timer device includes, for example, the plurality of timers and a plurality of counters that are respectively associated with the plurality of timers.

However, when the number of timers used by the external device is smaller than the number of timers provided in the timer device, one or some timers are not used by the external device. That is, a counter for a surplus timer is provided in a circuit, which increases the circuit scale.

The present disclosure provides an interface circuit, a digital circuit, a communication module, and a communication device that enable a reduced circuit scale.

An interface circuit according to an aspect of the present disclosure includes a first storage circuit that holds first timer selection information indicating which of a plurality of timers is to be selected; a second circuit including a first circuit that performs a counter operation, and a register update signal generation circuit that outputs, based on an output of the first circuit, a first register update signal for updating a register, the second circuit being capable of operating as any one of the plurality of timers; and a control circuit that controls, based on the first timer selection information from the first storage circuit and counter identification information that is received from an external device and that indicates any one of a plurality of counters associated with the plurality of timers, whether to enable or disable write to the first circuit or read from the first circuit.

According to the present disclosure, it is possible to provide an interface circuit, a digital circuit, a communication module, and a communication device that enable a reduced circuit scale.

BRIEF DESCRIPTION OF THE DRAWINGS

FIG. 20 is a time chart illustrating the operations of individual circuits in the digital circuit 412, and is a modification of the time chart illustrated in FIG. 5.

FIG. 21 is a continuation of the time chart illustrated in FIG. 20, and is a modification of the time chart illustrated in FIG. 6.

FIG. 22 is a continuation of the time chart illustrated in FIG. 21, and is a modification of the time chart illustrated in FIG. 7.

DETAILED DESCRIPTION

Hereinafter, embodiments of the present disclosure will be described in detail with reference to the drawings. The same elements are denoted by the same reference signs, and a duplicate description will be omitted as much as possible.

First Embodiment

A communication device 501 according to a first embodiment will be described.

Figure 1:
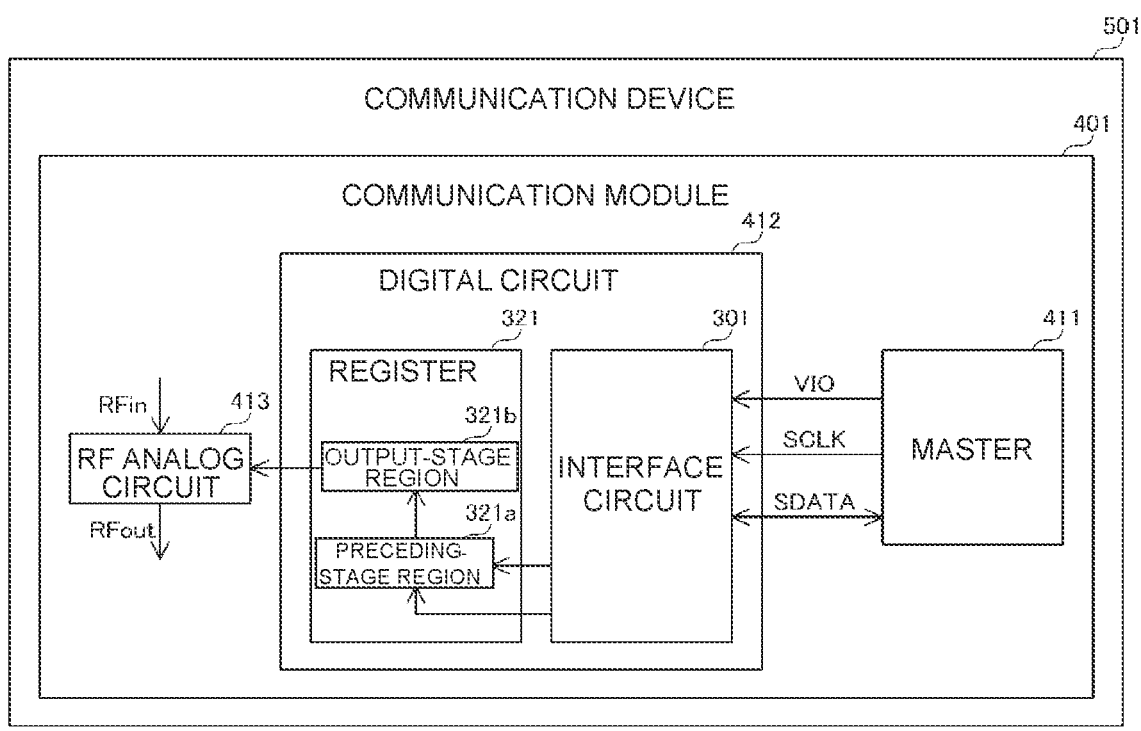
FIG. 1 is a diagram illustrating the configuration of a communication device 501.

FIG. 1 is a diagram illustrating the configuration of the communication device 501. As illustrated in FIG. 1, the communication device 501 includes a communication module 401. The communication module 401 includes a master 411 (external device), a digital circuit 412, and a radio frequency (RF) analog circuit (control target circuit) 413. The digital circuit 412 includes an interface (I/F) circuit 301 and a register 321.

The communication device 501 is, for example, a mobile communication device such as a smartphone. The communication module 401 includes, for example, various integrated circuit (IC) chips and elements.

The RF analog circuit 413 is, for example, a target to be controlled by the master 411. The RF analog circuit 413 includes, for example, an amplifier such as a low-noise amplifier or a power amplifier. The RF analog circuit 413 amplifies an input signal RFin and outputs an output signal RFout.

The input signal RFin is, for example, a reception signal or a transmission signal.

The RF analog circuit 413 may include, for example, a switch circuit. The switch circuit switches, for example, the path of an RF signal in the RF analog circuit 413. Accordingly, the amplifier to which the RF signal is input can be changed. In addition, the RF signal can be input to filter circuits of different bands.

The master 411 is, for example, an RFIC, and controls the RF analog circuit 413. Specifically, the master 411 controls, for example, the gain of the amplifier in the RF analog circuit 413, ON and OFF of the amplifier, ON and OFF of the switch in the switch circuit, and so forth.

The master 411 is capable of communicating with the interface circuit 301 in the digital circuit 412 by serial clock (SCLK) and serial data (SDATA).

The master 411 transmits serial data including various kinds of information to the interface circuit 301. The details of the various kinds of information will be described below.

The master 411 generates a clock signal SCLK that has a constant period and that is for operating the interface circuit 301, and transmits the generated clock signal SCLK to the interface circuit 301.

The interface circuit 301 operates based on the serial data received from the master 411. The interface circuit 301 operates, for example, at a timing based on the clock signal SCLK received from the master 411. Alternatively, the interface circuit 301 may operate at a timing based on a clock signal generated by another circuit or the interface circuit 301.

Figure 2:
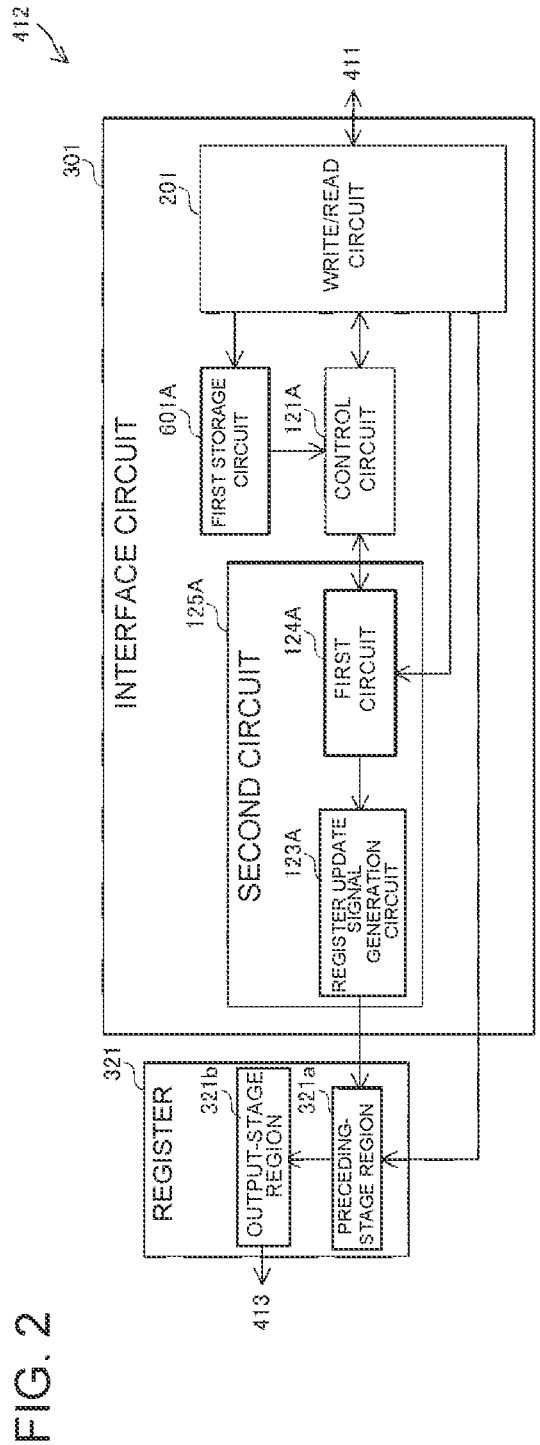
FIG. 2 is a diagram illustrating the configuration of a digital circuit 412 according to a first embodiment.

FIG. 2 is a diagram illustrating the configuration of the digital circuit 412 according to the first embodiment. As illustrated in FIG. 2, in the digital circuit 412 according to the first embodiment, the interface circuit 301 includes a control circuit 121A, a second circuit 125A, a write/read circuit 201, and a first storage circuit 601A. The second circuit 125A includes a register update signal generation circuit 123A and a first circuit 124A. The register 321 includes a preceding-stage region 321a and an output-stage region 321b.

The second circuit 125A performs a timer operation in which the second circuit 125A is capable of operating as any one of a plurality of timers that are controllable by the external device. In the present embodiment, the second circuit 125A operates as any one of five timers that are controllable by the master 411.

The master 411 is capable of using a plurality of timers. A case where the master 411 uses five timers will be described as an example. Each of the five timers is identified by, for example, any one of timer identifiers At, Bt, Ct, Dt, and Et. In the present embodiment, the master 411 is capable of simultaneously using one of the five timers. A case where the master 411 is capable of simultaneously using two or more timers will be described below.

The master 411 transmits, to the write/read circuit 201 in the interface circuit 301, first timer selection information indicating which of the five timers is to be selected. The first timer selection information indicates one of the timer identifiers At, Bt, Ct, Dt, and Et.

The write/read circuit 201 receives the first timer selection information from the master 411 and stores the timer identifier indicated by the first timer selection information in the first storage circuit 601A. The first storage circuit 601A is, for example, a register.

The master 411 also transmits, to the write/read circuit 201, control information for controlling the RF analog circuit 413. The control information is, for example, information for controlling the gain of the amplifier in the RF analog circuit 413, ON and OFF of the amplifier, ON and OFF of the switch in the switch circuit, and so forth. The write/read circuit 201 receives the control information from the master 411 and stores the control information in the preceding-stage region 321a in the register 321.

Figure 3:
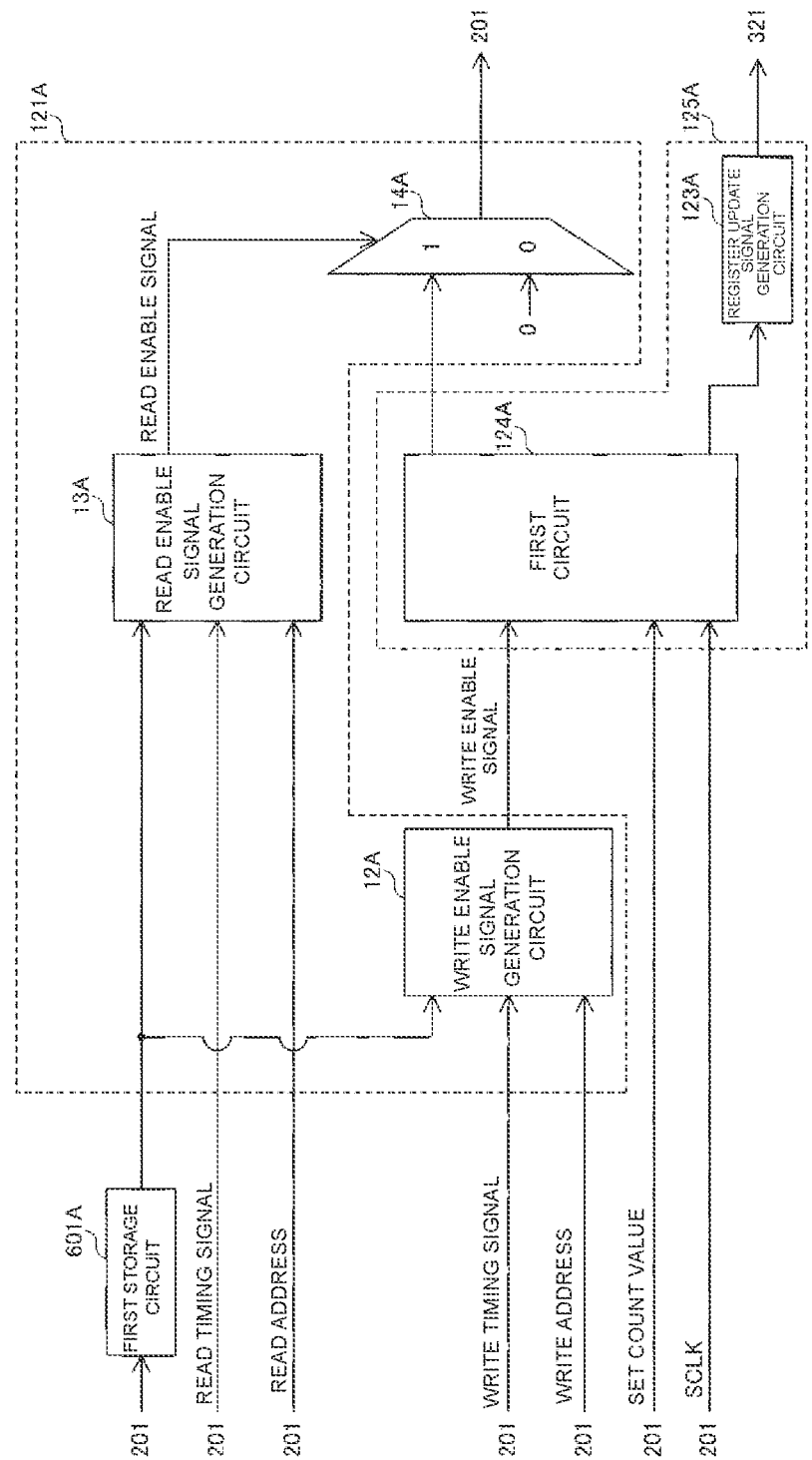
FIG. 3 is a diagram illustrating a detailed configuration of a control circuit 121A and peripheral circuits of the control circuit 121A.

FIG. 3 is a diagram illustrating a detailed configuration of the control circuit 121A and peripheral circuits of the control circuit 121A. As illustrated in FIG. 3, the control circuit 121A includes a write enable signal generation circuit 12A, a read enable signal generation circuit 13A, and a selection circuit 14A.

As illustrated in FIG. 1 to FIG. 3, the first circuit 124A in the second circuit 125A performs a counter operation. The first circuit 124A operates as any one of counters used for the five respective timers. Each of the counters used for the five respective timers is identified by, for example, any one of counter identifiers Ac, Bc, Cc, Dc, and Ec. The first circuit 124A may be capable of operating as any one of four or less and two or more counters, or any one of six or more counters.

The counter identifiers Ac, Bc, Cc, Dc, and Ec are, for example, write addresses or read addresses. A write address is an address for specifying a counter at the time of writing a count value. A read address is an address for specifying a counter at the time of reading a count value.

The master 411 transmits, to the write/read circuit 201, counter identification information indicating the write address or read address of any one of the five counters.

The write/read circuit 201 receives the counter identification information from the master 411 and, at the time of writing a count value, outputs a write address indicated by the counter identification information to the write enable signal generation circuit 12A. At the time of reading a count value, the write/read circuit 201 outputs a read address indicated by the counter identification information to the read enable signal generation circuit 13A.

The master 411 also transmits, to the write/read circuit 201, setting information indicating a set count value to be written to the first circuit 124A. The write/read circuit 201 receives the setting information from the master 411 and outputs the set count value indicated by the setting information to the first circuit 124A.

The write/read circuit 201 receives a clock signal SCLK from the master 411 and outputs the clock signal SCLK to the first circuit 124A.

The write/read circuit 201 outputs, based on the serial data from the master 411, a write timing signal and a read timing signal to the write enable signal generation circuit 12A and the read enable signal generation circuit 13A, respectively.

The write timing signal indicates the timing to write the set count value to the first circuit 124A. The read timing signal indicates the timing to read the count value of the first circuit 124A.

Figure 4:
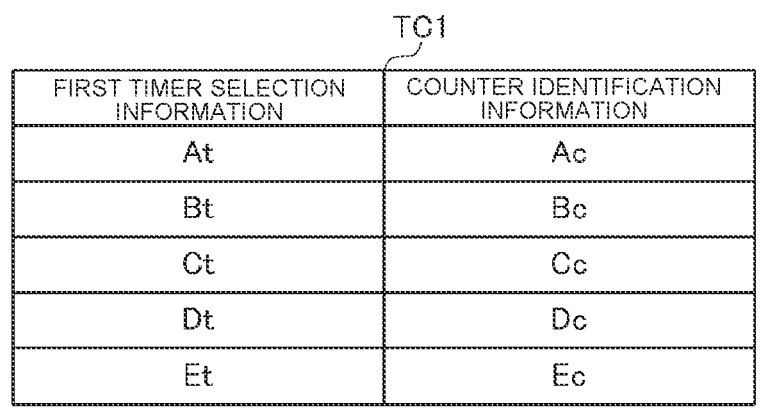
FIG. 4 illustrates a correspondence table TC1.

FIG. 4 illustrates a correspondence table TC1, which is an example of the correspondence between counter identification information and first timer selection information.

The five counters are used for the five timers, respectively. As shown in the correspondence table TC1 in FIG. 4, the correspondence between the timer identifier At, Bt, Ct, Dt, or Et and the counter identifier Ac, Bc, Cc, Dc, or Ec is defined. For example, in response to the timer having the timer identifier At being selected, the counter having the counter identifier Ac is selected.

(Write to First Circuit 124A)

As illustrated in FIG. 3 and FIG. 4, the write enable signal generation circuit 12A in the control circuit 121A controls, based on the first timer selection information from the first storage circuit 601A and the counter identification information from the write/read circuit 201, whether to enable or disable write to the first circuit 124A.

Specifically, the write enable signal generation circuit 12A generates, based on the first timer selection information from the first storage circuit 601A and the write address and the write timing signal from the write/read circuit 201, a write enable signal for permitting write of a set count value to the first circuit 124A.

When permitting write of a set count value to the first circuit 124A, the write enable signal generation circuit 12A outputs, for example, a high-level write enable signal to the first circuit 124A. On the other hand, when not permitting write of a set count value to the first circuit 124A, the write enable signal generation circuit 12A outputs, for example, a low-level write enable signal to the first circuit 124A.

In response to the write enable signal being changed from a low level to a high level, the set count value from the write/read circuit 201 is written to the first circuit 124A. The count value of the first circuit 124A decreases based on the clock signal SCLK.

The register update signal generation circuit 123A in the second circuit 125A outputs, based on an output of the first circuit 124A, a first register update signal for updating the register 321. Specifically, for example, in response to the count value of the first circuit 124A becoming zero, the register update signal generation circuit 123A outputs a high-level first register update signal to the preceding-stage region 321a in the register 321 (see FIG. 2).

In response to the high-level first register update signal being supplied to the preceding-stage region 321a, the register 321 transfers the control information held in the preceding-stage region 321a to the output-stage region 321b. The control information transferred to the output-stage region 321b is transmitted to the RF analog circuit 413 (see FIG. 1). Accordingly, the RF analog circuit 413 is controlled.

(Operation of Writing Count Value)

Figure 5:
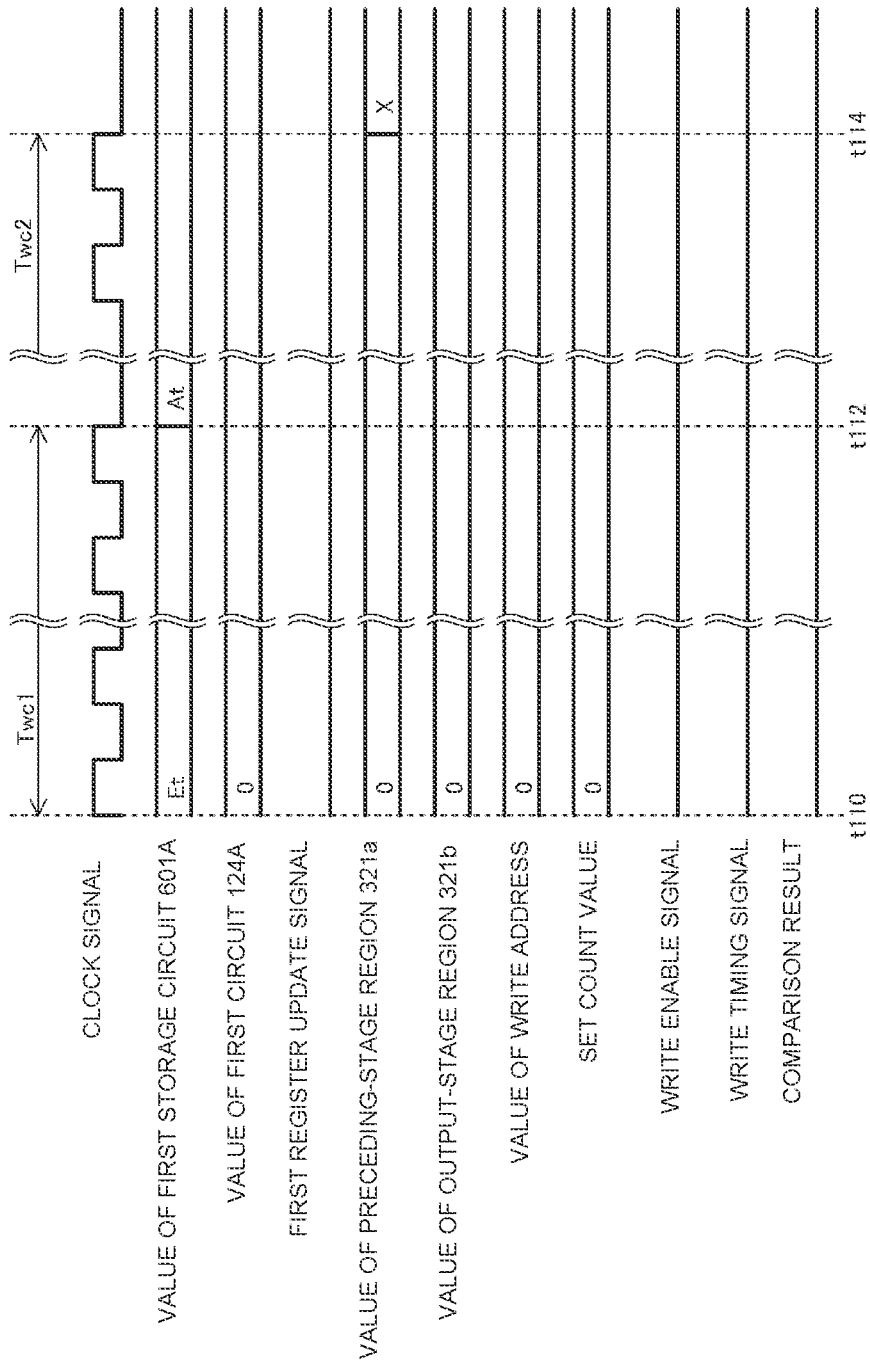
FIG. 5 is a time chart illustrating the operations of individual circuit in the digital circuit 412.

FIG. 5 is a time chart illustrating the operations of individual circuits in the digital circuit 412. As illustrated in FIG. 5, for example, a situation is assumed in which the timer used by the master 411 is changed from the timer having the timer identifier Et to the timer having the timer identifier At. A situation is also assumed in which the value held in the preceding-stage region 321a of the register 321 is rewritten to X.

As illustrated in FIG. 2, FIG. 3, and FIG. 5, at time t110, the value held by the first storage circuit 601A and the count value of the first circuit 124A are Et and zero, respectively. Zero is held in both the preceding-stage region 321a and the output-stage region 321b of the register 321.

The write/read circuit 201 sets a write command period Twc1, and rewrites the value held by the first storage circuit 601A from Et to At at time t112 at which the write command period Twc1 ends.

Next, the write/read circuit 201 sets a write command period Twc2 (the period from a start time to a middle time of this period is not illustrated), and rewrites, based on control information, the value held in the preceding-stage region 321a from zero to X at time t114 at which the write command period Twc2 ends.

Figure 6:
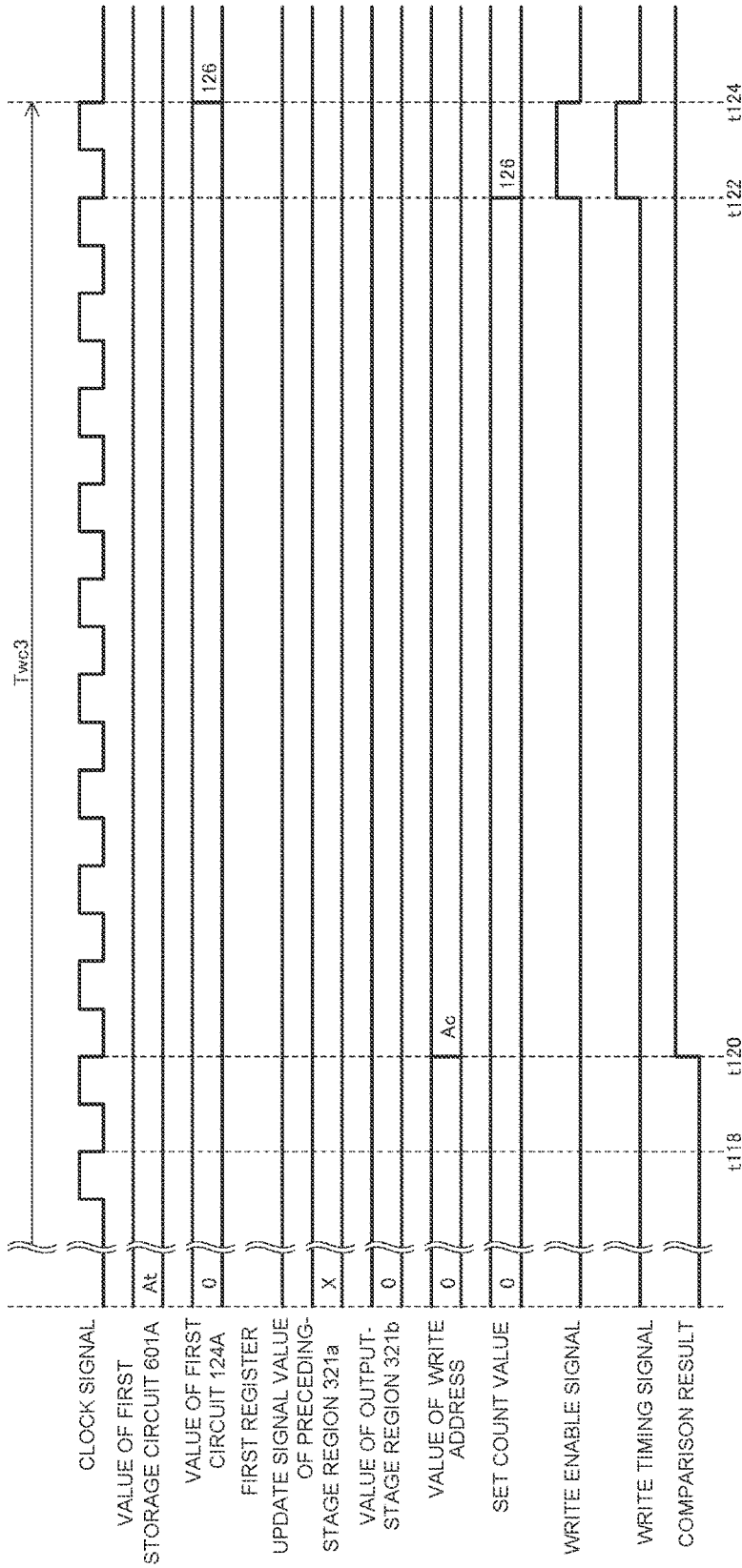
FIG. 6 is a continuation of the time chart illustrated in FIG. 5.

FIG. 6 is a time chart illustrating the operations of individual circuits in the digital circuit 412. FIG. 6 is a continuation of the time chart illustrated in FIG. 5. As illustrated in FIG. 6, for example, a situation is assumed in which the counter having the write address Ac is selected as a counter used for the timer having the timer identifier At. For example, a situation is also assumed in which the count value of the first circuit 124A is rewritten from zero to 126.

As illustrated in FIG. 3, FIG. 4, and FIG. 6, the write/read circuit 201 sets a write command period Twc3 (the period from a start time to a middle time of this period is not illustrated), and changes the write address from zero to Ac at time t120 within the write command period Twc3.

At a time before time t120 at which the write address becomes Ac (for example, at time t118), the write enable signal generation circuit 12A determines that the timer and the counter are not associated with each other, based on the value held by the first storage circuit 601A, the write address from the write/read circuit 201, and the correspondence table TC1.

Specifically, the write enable signal generation circuit 12A recognizes, based on the correspondence table TC1, that the timer identifier At held by the first storage circuit 601A is associated with the counter identifier Ac. Subsequently, the write enable signal generation circuit 12A compares the counter identifier Ac associated with the timer identifier At with the write address from the write/read circuit 201, that is, zero. The comparison result indicates that both are not the same, and thus the write enable signal generation circuit 12A determines that the timer and the counter are not associated with each other.

On the other hand, at or after time t120 at which the write address becomes Ac, the comparison result indicates that the counter identifier Ac associated with the timer identifier At matches the write address Ac from the write/read circuit 201, and thus the write enable signal generation circuit 12A determines that the timer and the counter are associated with each other.

Next, the write/read circuit 201 switches the write timing signal from a low level to a high level at time t122, which is one clock before time t124 at which the write command period Twc3 ends.

In addition, the write/read circuit 201 switches the set count value to be output to the first circuit 124A from zero to 126.

Because a determination is made that the timer and the counter are associated with each other and the write timing signal indicates a high level, the write enable signal generation circuit 12A outputs a high-level write enable signal to the first circuit 124A from time t122 to time t124.

Accordingly, the count value of the first circuit 124A is set to the set count value from the write/read circuit 201, that is, 126.

Figure 7:
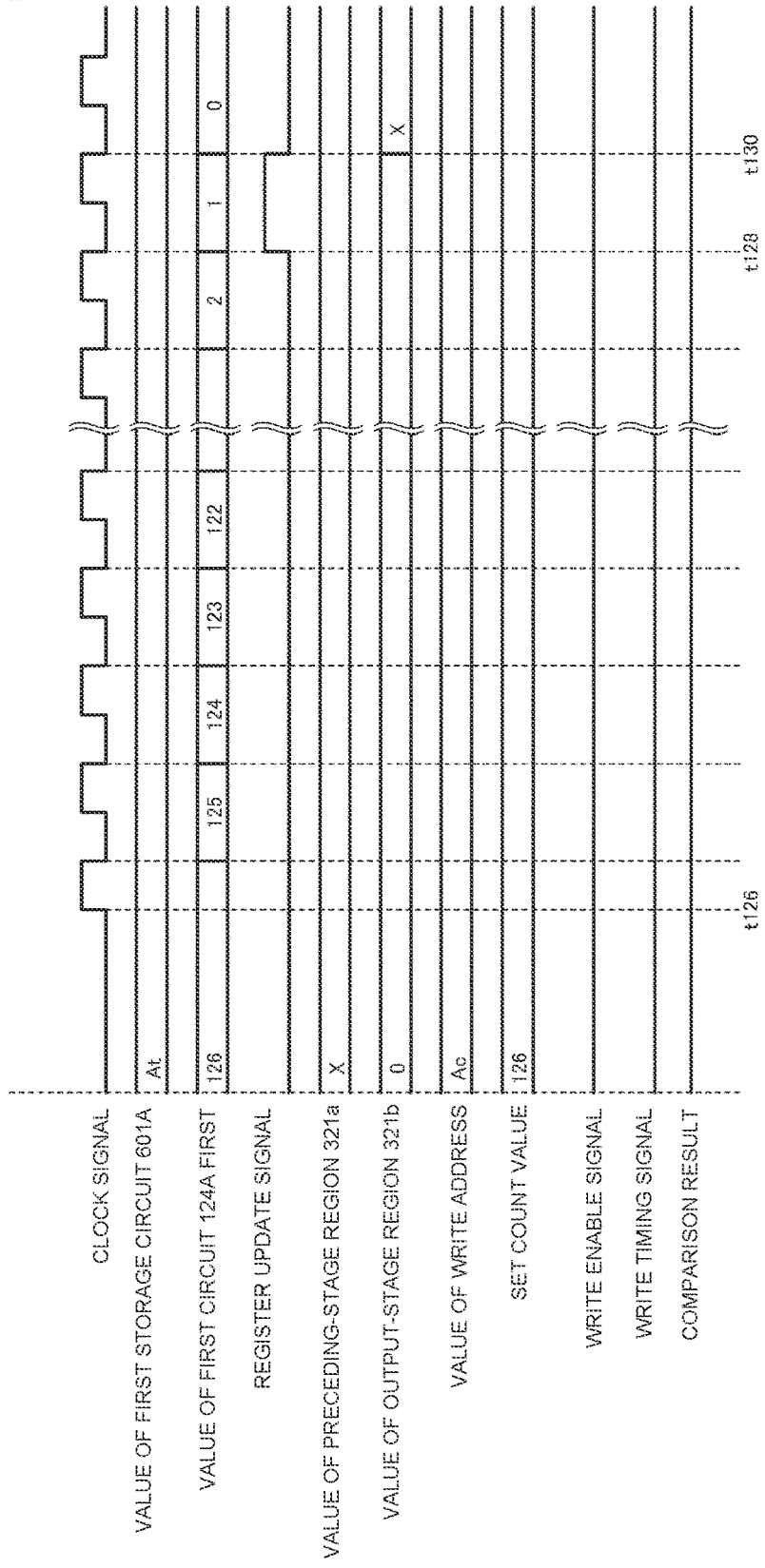
FIG. 7 is a continuation of the time chart illustrated in FIG. 6.

FIG. 7 is a time chart illustrating the operations of individual circuits in the digital circuit 412. FIG. 7 is a continuation of the time chart illustrated in FIG. 6. As illustrated in FIG. 7, for example, a situation is assumed in which control information is transferred from the register 321 to the RF analog circuit 413 when the count value set in the first circuit 124A is decremented to become zero.

As illustrated in FIG. 2, FIG. 3, and FIG. 7, at time t126, the write/read circuit 201 receives a clock signal SCLK from the master 411 and outputs the clock signal SCLK to the first circuit 124A.

Next, the first circuit 124A decrements the count value for each clock, based on the clock signal SCLK received from the write/read circuit 201.

The register update signal generation circuit 123A monitors the count value of the first circuit 124A, and outputs a low-level first register update signal to the register 321 until the count value of the first circuit 124A becomes 1.

Next, the register update signal generation circuit 123A outputs, to the register 321, a high-level first register update signal indicating that the timer has expired, during one clock from time t128 at which the count value of the first circuit 124A is decremented from 2 to 1.

In response to the high-level first register update signal being supplied to the preceding-stage region 321a, the register 321 transfers X held in the preceding-stage region 321a to the output-stage region 321b. X transferred to the output-stage region 321b is transmitted to the RF analog circuit 413 (see FIG. 1).

(Read From First Circuit 124A)

As illustrated in FIG. 3, the read enable signal generation circuit 13A in the control circuit 121A controls, based on the first timer selection information from the first storage circuit 601A and the counter identification information from the write/read circuit 201, whether to enable or disable read from the first circuit 124A.

In response to the read enable signal generation circuit 13A enabling read from the first circuit 124A, the write/read circuit 201 transmits count information indicating the count value of the first circuit 124A to the master 411.

Specifically, the read enable signal generation circuit 13A generates, based on the first timer selection information from the first storage circuit 601A and the read address and read timing signal from the write/read circuit 201, a read enable signal for causing the count value of the first circuit 124A to be output to the write/read circuit 201.

When causing the count value of the first circuit 124A to be output to the write/read circuit 201, the read enable signal generation circuit 13A outputs, for example, a high-level read enable signal to the selection circuit 14A. On the other hand, when causing the count value of the first circuit 124A not to be output to the write/read circuit 201, the read enable signal generation circuit 13A outputs, for example, a low-level read enable signal to the selection circuit 14A.

When the read enable signal is at a high level, the selection circuit 14A outputs a signal including count information indicating the count value of the first circuit 124A to the write/read circuit 201.

On the other hand, when the read enable signal is at a low level, the selection circuit 14A outputs a signal indicating zero to the write/read circuit 201.

(Operation of Reading Count Value)

Figure 8:
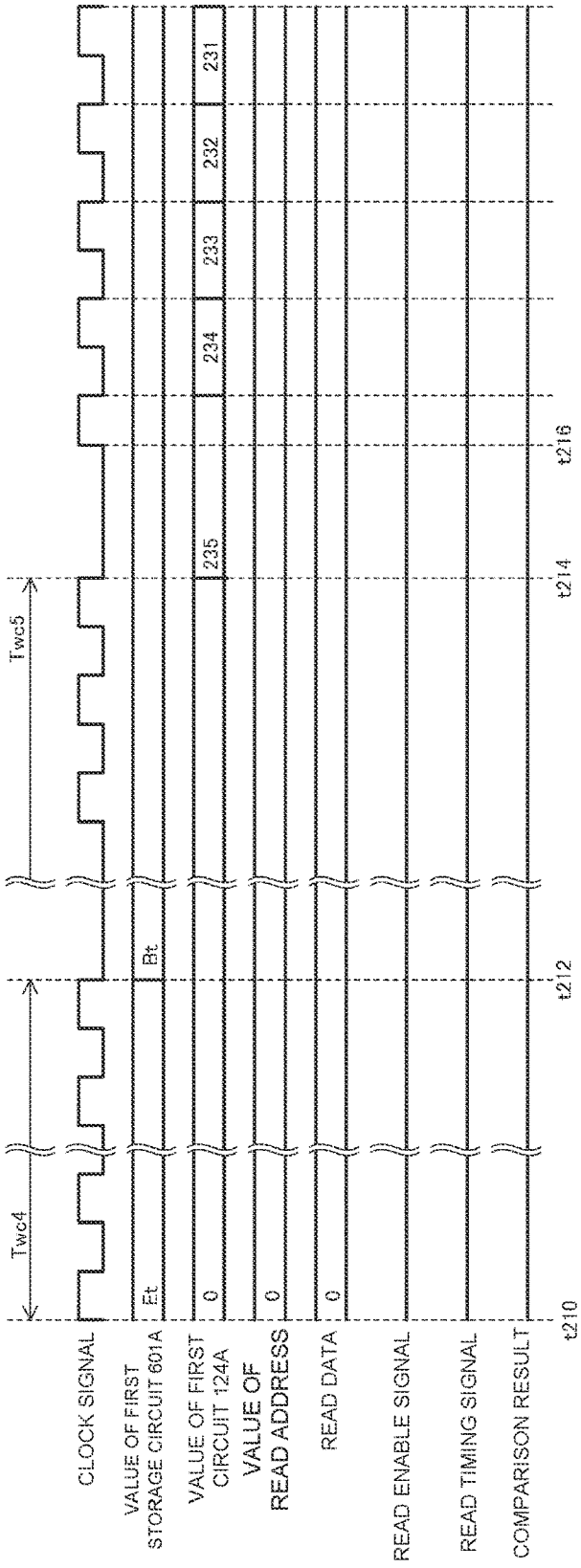
FIG. 8 is a time chart illustrating the operations of individual circuit in the digital circuit 412.

FIG. 8 is a time chart illustrating the operations of individual circuits in the digital circuit 412. As illustrated in FIG. 8, for example, a situation is assumed in which the timer used by the master 411 is changed from the timer having the timer identifier Et to the timer having the timer identifier Bt. Furthermore, a situation is assumed in which the count value of the first circuit 124A is rewritten from zero to 235.

As illustrated in FIG. 2, FIG. 3, and FIG. 8, at time t210, the value held by the first storage circuit 601A and the count value of the first circuit 124A are Et and zero, respectively.

The write/read circuit 201 sets a write command period Twc4, and rewrites the value held by the first storage circuit 601A from Et to Bt at time t212 at which the write command period Twc4 ends.

Next, the count value in the first circuit 124A is rewritten from zero to 235 by the write enable signal generation circuit 12A and the write/read circuit 201 at time t214 at which a write command period Twc5 ends.

Next, at time t216, the write/read circuit 201 receives a clock signal SCLK from the master 411 and outputs the clock signal SCLK to the first circuit 124A.

Next, the first circuit 124A decrements the count value for each clock, based on the clock signal SCLK received from the write/read circuit 201.

Figure 9:
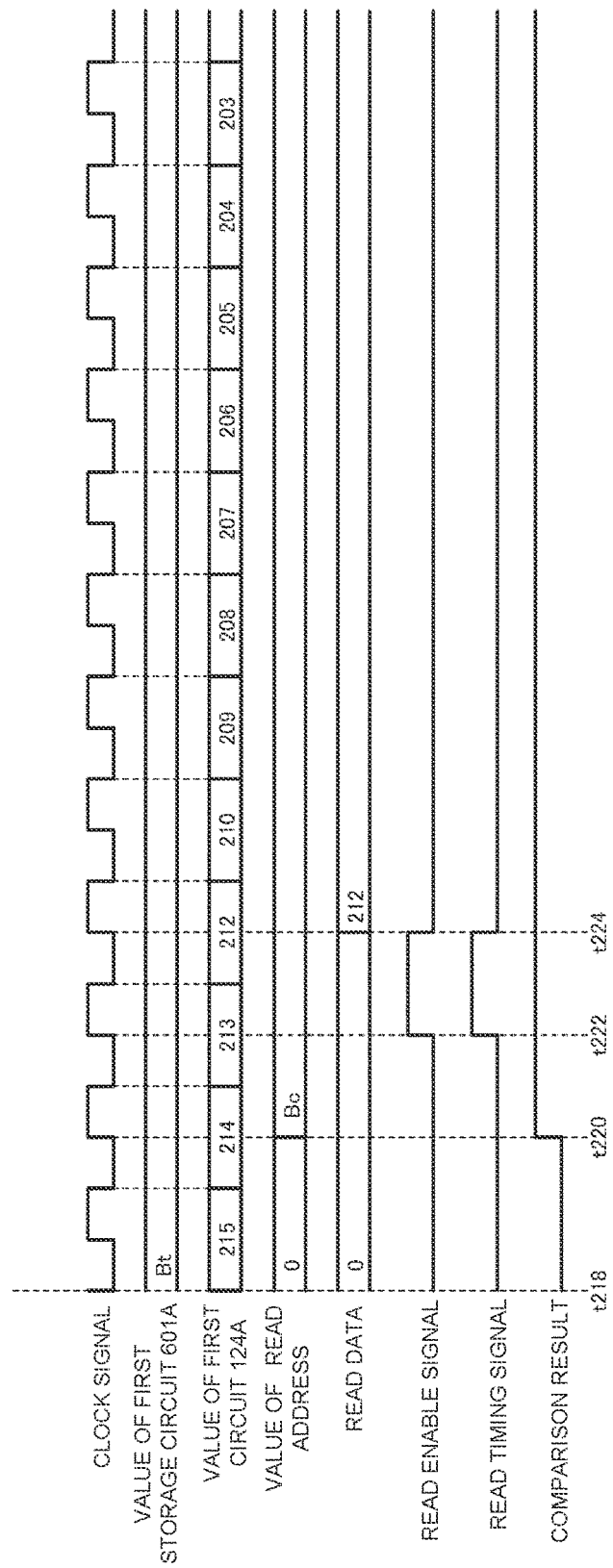
FIG. 9 is a continuation of the time chart illustrated in FIG. 8.

FIG. 9 is a time chart illustrating the operations of individual circuits in the digital circuit 412. FIG. 9 is a continuation of the time chart illustrated in FIG. 8. As illustrated in FIG. 9, for example, a situation is assumed in which the counter having the read address Bc is selected as a counter used for the timer having the timer identifier Bt, and the count value of the selected counter is read.

As illustrated in FIG. 3, FIG. 4, and FIG. 9, the write/read circuit 201 changes the read address from zero to Bc at time t220.

The read enable signal generation circuit 13A determines, based on the value held by the first storage circuit 601A, the read address from the write/read circuit 201, and the correspondence table TC1, that the timer and the counter are not associated with each other at a timing before time t220 (for example, at time t218).

Specifically, the read enable signal generation circuit 13A recognizes, based on the correspondence table TC1, that the timer identifier Bt held by the first storage circuit 601A is associated with the counter identifier Bc. The read enable signal generation circuit 13A then compares the counter identifier Bc associated with the timer identifier Bt with the read address from the write/read circuit 201, that is, zero. The comparison result indicates that both are not the same, and thus the read enable signal generation circuit 13A determines that the timer and the counter are not associated with each other.

On the other hand, at or after time t220 at which the read address becomes Bc, the comparison result indicates that the counter identifier Bc associated with the timer identifier Bt matches the read address Bc from the write/read circuit 201, and thus the read enable signal generation circuit 13A determines that the timer and the counter are associated with each other.

Next, the write/read circuit 201 switches the read timing signal from a low level to a high level at time t222, which is one clock after time t220.

Because a determination is made that the timer and the counter are associated with each other and the read timing signal indicates a high level, the read enable signal generation circuit 13A outputs a high-level read enable signal to the selection circuit 14A from time t222 to time t224.

At time t224 at which the read enable signal is switched from a high level to a low level, the selection circuit 14A outputs a signal including count information indicating the count value of the first circuit 124A, that is, 212, to the write/read circuit 201.

The write/read circuit 201 receives the signal including count information from the read enable signal generation circuit 13A, includes the count information in serial data, and transmits the serial data to the master 411.

Second Embodiment

A digital circuit 412 according to a second embodiment will be described. In the second embodiment and thereafter, a description of the same matters as those of the first embodiment will be omitted, and only differences will be described. In particular, similar functions and effects obtained from similar configurations will not be repeatedly described in each embodiment.

Figure 10:
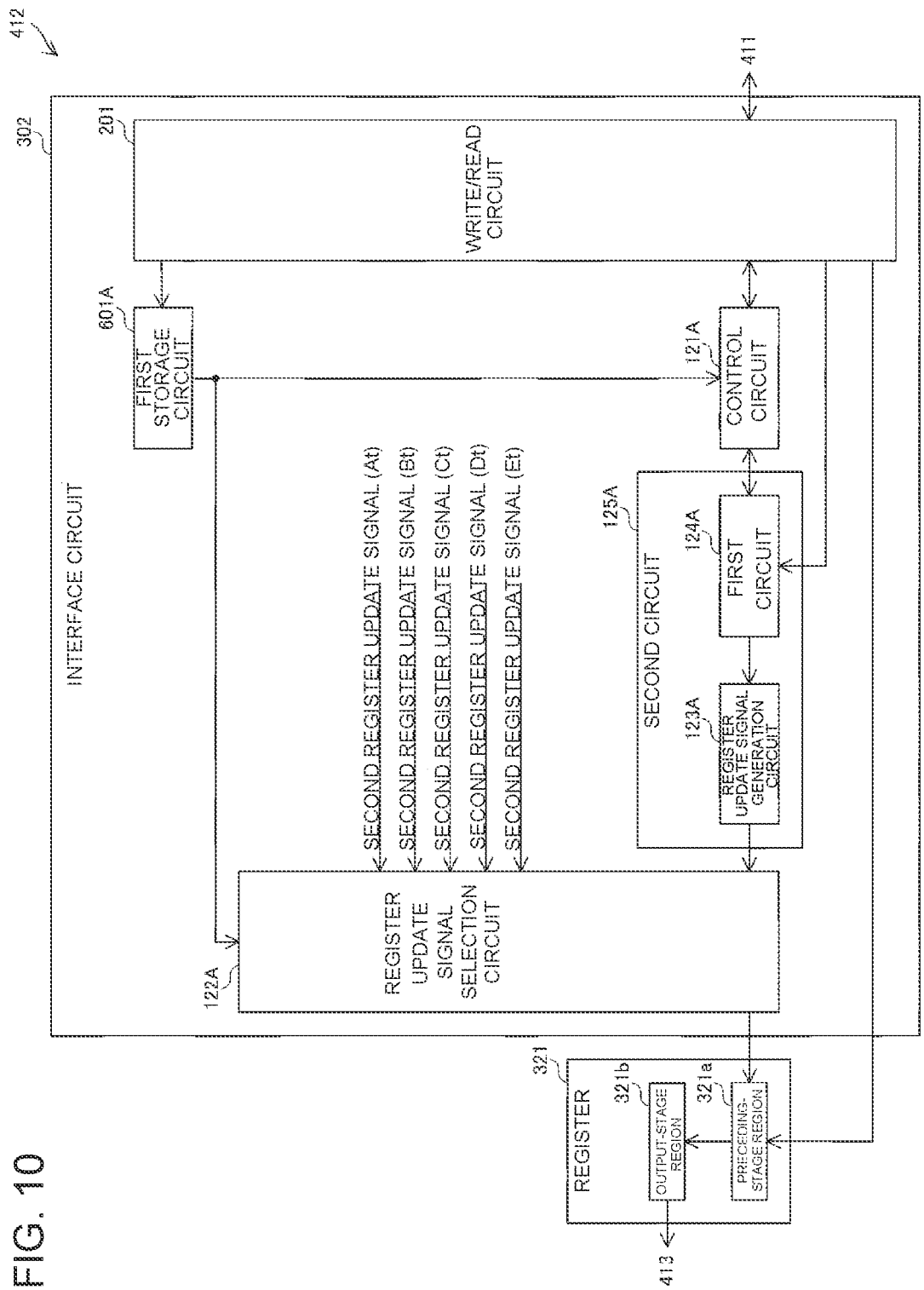
FIG. 10 is a diagram illustrating the configuration of a digital circuit 412 according to a second embodiment.

FIG. 10 is a diagram illustrating the configuration of the digital circuit 412 according to the second embodiment. As illustrated in FIG. 10, the digital circuit 412 according to the second embodiment is different from the digital circuit 412 according to the first embodiment in that any one of five second register update signals is selected and output to the register 321.

The digital circuit 412 illustrated in FIG. 10 includes an interface circuit 302 instead of the interface circuit 301, as compared with the digital circuit 412 illustrated in FIG. 2. The interface circuit 302 further includes a register update signal selection circuit 122A, as compared with the interface circuit 301 illustrated in FIG. 2.

The register update signal selection circuit 122A selects one signal from among a first register update signal from the register update signal generation circuit 123A and second register update signals (At), (Bt), (Ct), (Dt), and (Et) different from the first register update signal, and outputs the selected signal to the register 321.

The second register update signals (At), (Bt), (Ct), (Dt), and (Et) are supplied, for example, from the master 411 to the register update signal selection circuit 122A through the write/read circuit 201.

The second register update signals (At), (Bt), (Ct), (Dt), and (Et) are associated with the timers having the timer identifiers At, Bt, Ct, Dt, and Et, respectively.

The second register update signals (At), (Bt), (Ct), (Dt), and (Et) are signals for updating the register 321, similar to the first register update signal output from the second circuit 125A that operates as the timers having the timer identifiers At, Bt, Ct, Dt, and Et.

Figure 11:
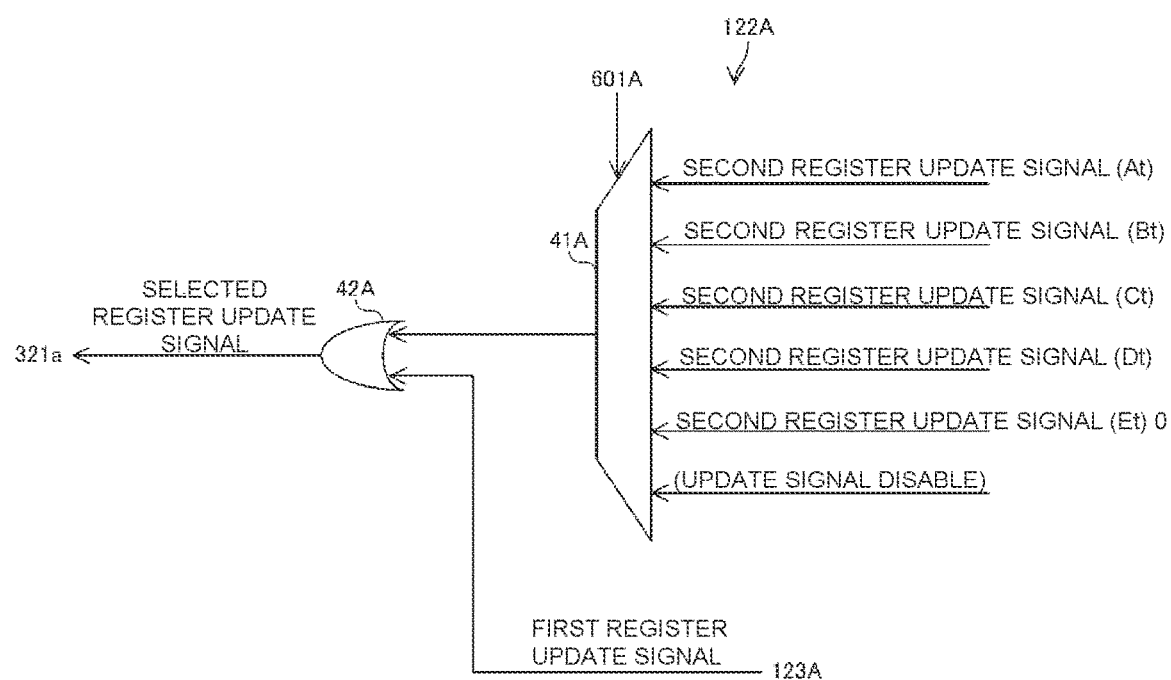
FIG. 11 is a diagram illustrating the configuration of a register update signal selection circuit 122A.

FIG. 11 is a diagram illustrating the configuration of the register update signal selection circuit 122A. As illustrated in FIG. 11, the register update signal selection circuit 122A includes a selection circuit 41A and an OR gate 42A.

The selection circuit 41A selects, based on the value held by the first storage circuit 601A, any one of the second register update signals (At), (Bt), (Ct), (Dt), and (Et), and outputs the selected signal to the OR gate 42A.

Specifically, when the value held by the first storage circuit 601A is At, Bt, Ct, Dt, or Et, the selection circuit 41A selects the second register update signal (At), (Bt), (Ct), (Dt), or (Et), respectively. The selection circuit 41A outputs a signal having the same level as that of the selected signal to the OR gate 42A.

When the value held by the first storage circuit 601A is different from any of At, Bt, Ct, Dt, and Et, the selection circuit 41A outputs a signal having the same level as the level of 0 (update signal disable), that is, a low level, to the OR gate 42A.

The OR gate 42A receives the first register update signal from the register update signal generation circuit 123A and the signal from the selection circuit 41A and outputs, as a selected register update signal, a signal indicating the logical OR of the signals to the preceding-stage region 321a.

Specifically, for example, when the master 411 selects the timer having the timer identifier At and transmits a high-level second register update signal (At) to the interface circuit 302, a selected high-level register update signal is input to the preceding-stage region 321a.

That is, the master 411 is capable of updating the register 321 at the timing at which the high-level second register update signal (At) is transmitted to the interface circuit 302, as well as the timing at which the counter value of the first circuit 124A becomes zero.

Third Embodiment

Figure 12:
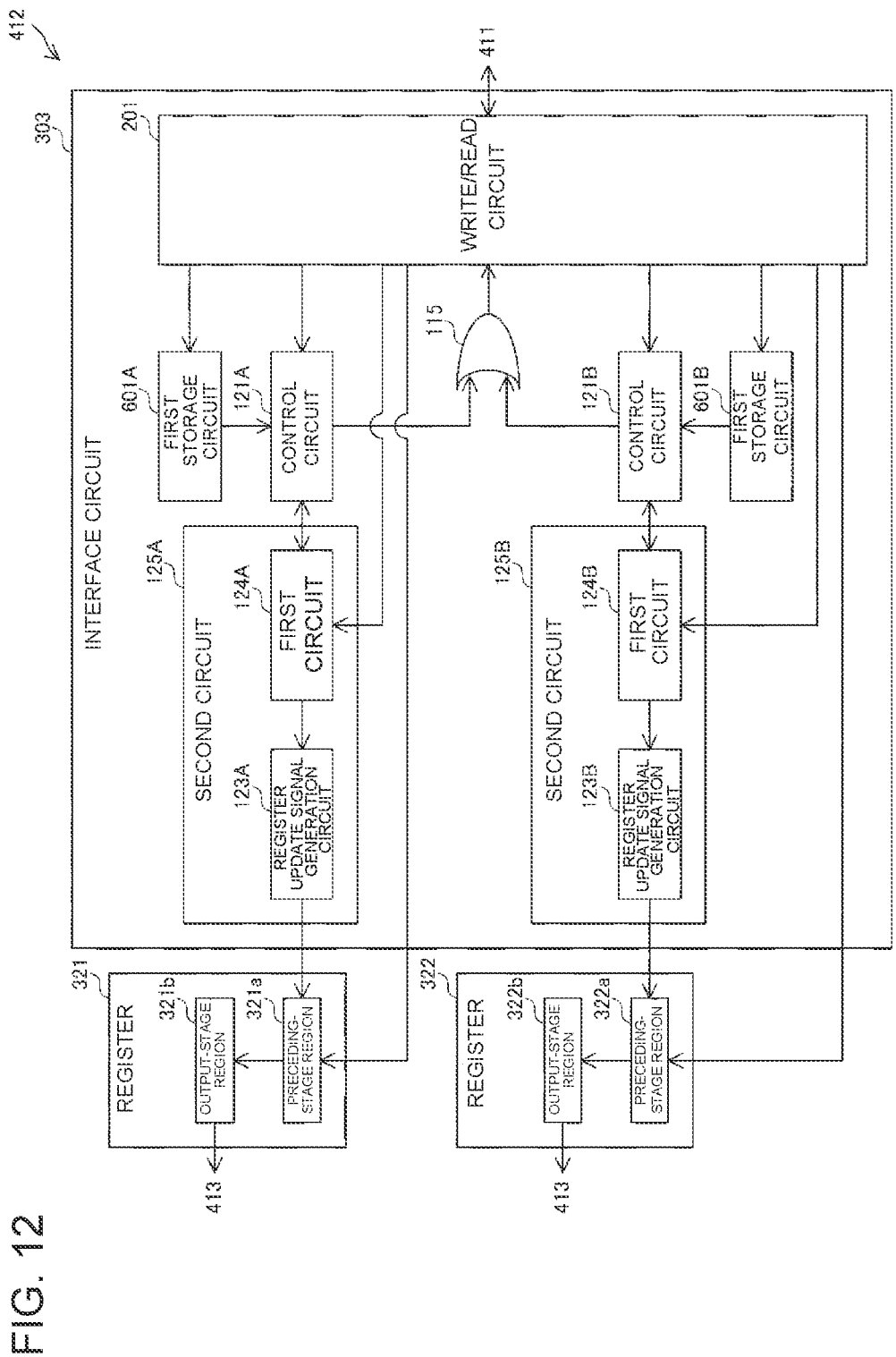
FIG. 12 is a diagram illustrating the configuration of a digital circuit 412 according to a third embodiment.

A digital circuit 412 according to a third embodiment will be described. FIG. 12 is a diagram illustrating the configuration of the digital circuit 412 according to the third embodiment. As illustrated in FIG. 12, the digital circuit 412 according to the third embodiment is different from the digital circuit 412 according to the first embodiment in that the master 411 is capable of simultaneously using two timers.

The digital circuit 412 illustrated in FIG. 12 includes an interface circuit 303 instead of the interface circuit 301 and further includes a register 322, as compared with the digital circuit 412 illustrated in FIG. 2. The register 322 includes a preceding-stage region 322a and an output-stage region 322b.

The interface circuit 303 further includes an OR gate 115 (output circuit), a control circuit 121B, a second circuit 125B, and a first storage circuit 601B, as compared with the interface circuit 301 illustrated in FIG. 2. The second circuit 125B includes a register update signal generation circuit 123B and a first circuit 124B. That is, the interface circuit 303 includes two sets of a control circuit, a second circuit, and a first storage circuit.

The register 322, the preceding-stage region 322a, and the output-stage region 322b have functions similar to those of the register 321, the preceding-stage region 321a, and the output-stage region 321b, respectively. The control circuit 121B, the register update signal generation circuit 123B, the first circuit 124B, the second circuit 125B, and the first storage circuit 601B have functions similar to those of the control circuit 121A, the register update signal generation circuit 123A, the first circuit 124A, the second circuit 125A, and the first storage circuit 601A, respectively.

The OR gate 115 outputs the count information from either of the first circuits 124A and 124B to the write/read circuit 201.

Specifically, when having enabled read from the first circuit 124A, the control circuit 121A outputs a signal including count information indicating the count value of the first circuit 124A (hereinafter may be referred to as first count information) to the OR gate 115.

Similarly, when having enabled read from the first circuit 124B, the control circuit 121B outputs a signal including count information indicating the count value of the first circuit 124B (hereinafter may be referred to as second count information) to the OR gate 115.

The OR gate 115 receives the signal including the first count information from the control circuit 121A and outputs the signal including the first count information to the write/read circuit 201. The write/read circuit 201 receives the signal including the first count information from the OR gate 115, includes the first count information in serial data, and transmits the serial data to the master 411.

The OR gate 115 receives the signal including the second count information from the control circuit 121B and outputs the signal including the second count information to the write/read circuit 201. The write/read circuit 201 receives the signal including the second count information from the OR gate 115, includes the second count information in serial data, and transmits the serial data to the master 411.

In the present embodiment, a description has been given of a configuration in which two sets of a control circuit, a second circuit, and a first storage circuit are provided, but the present disclosure is not limited thereto. The digital circuit 412 may include three or more sets of a control circuit, a second circuit, and a first storage circuit. In this case, the output circuit outputs, to the write/read circuit 201, count information from the first circuit in any one of the sets. This enables the master 411 to simultaneously use three or more timers.

Fourth Embodiment

Figure 13:
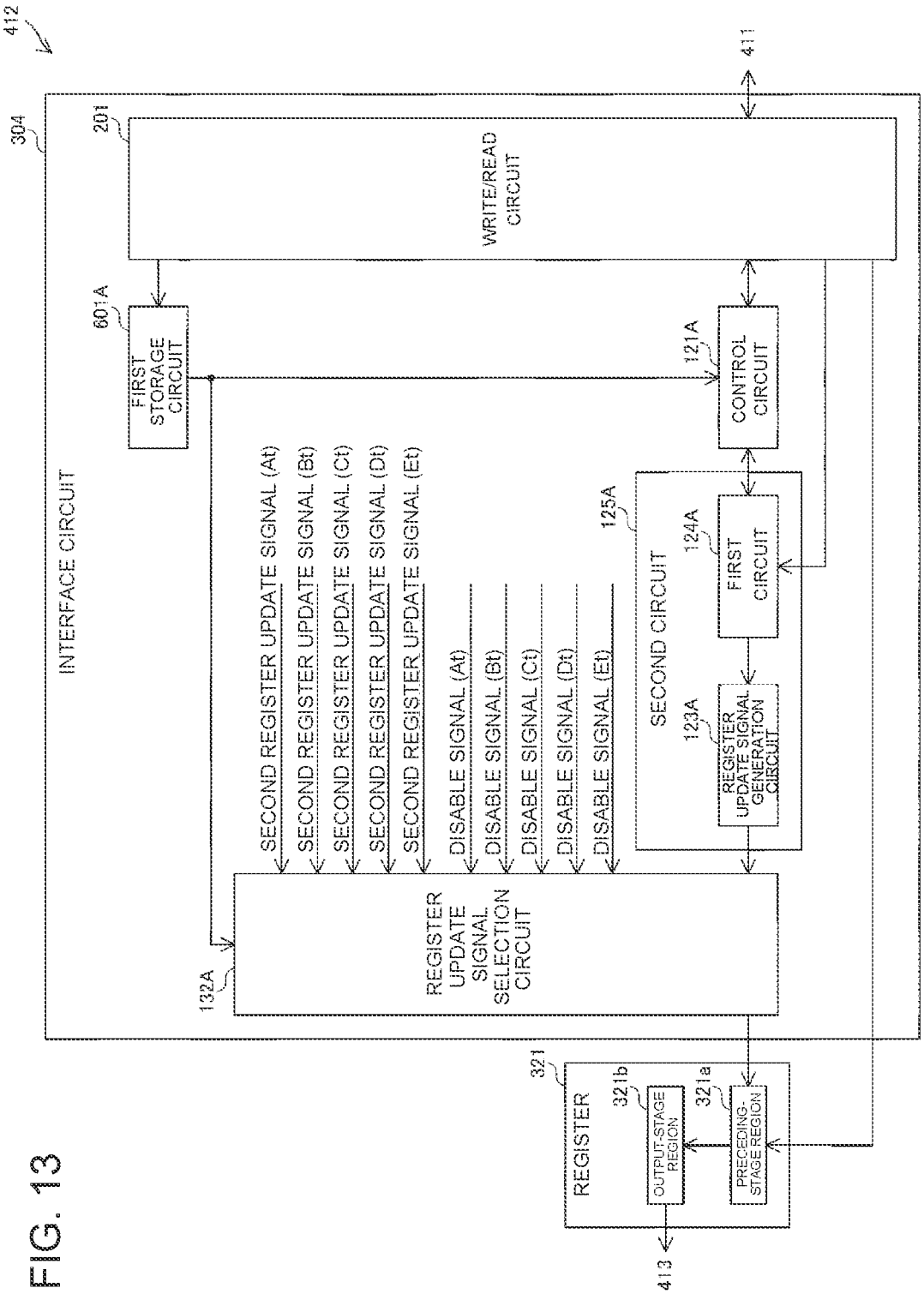
FIG. 13 is a diagram illustrating the configuration of a digital circuit 412 according to a fourth embodiment.

A digital circuit 412 according to a fourth embodiment will be described. FIG. 13 is a diagram illustrating the configuration of the digital circuit 412 according to the fourth embodiment. As illustrated in FIG. 13, the digital circuit 412 according to the fourth embodiment is different from the digital circuit 412 according to the second embodiment in having a function of disabling a first register update signal output from the register update signal generation circuit 123A and a second register update signal.

The digital circuit 412 illustrated in FIG. 13 includes an interface circuit 304 instead of the interface circuit 302, as compared with the digital circuit 412 illustrated in FIG. 10.

The interface circuit 304 includes a register update signal selection circuit 132A instead of the register update signal selection circuit 122A, as compared with the interface circuit 302 illustrated in FIG. 10.

Disable signals (At), (Bt), (Ct), (Dt), and (Et) are supplied, for example, from the master 411 to the register update signal selection circuit 132A through the write/read circuit 201.

The disable signals (At), (Bt), (Ct), (Dt), and (Et) are associated with the timers having the timer identifiers At, Bt, Ct, Dt, and Et, respectively.

The disable signals (At), (Bt), (Ct), (Dt), and (Et) are signals for disabling the first register update signals from the second circuit 125A that operates as the timers having the timer identifiers At, Bt, Ct, Dt, and Et, respectively.

The disable signals (At), (Bt), (Ct), (Dt), and (Et) are signals for disabling the second register update signals (At), (Bt), (Ct), (Dt), and (Et), respectively.

Figure 14:
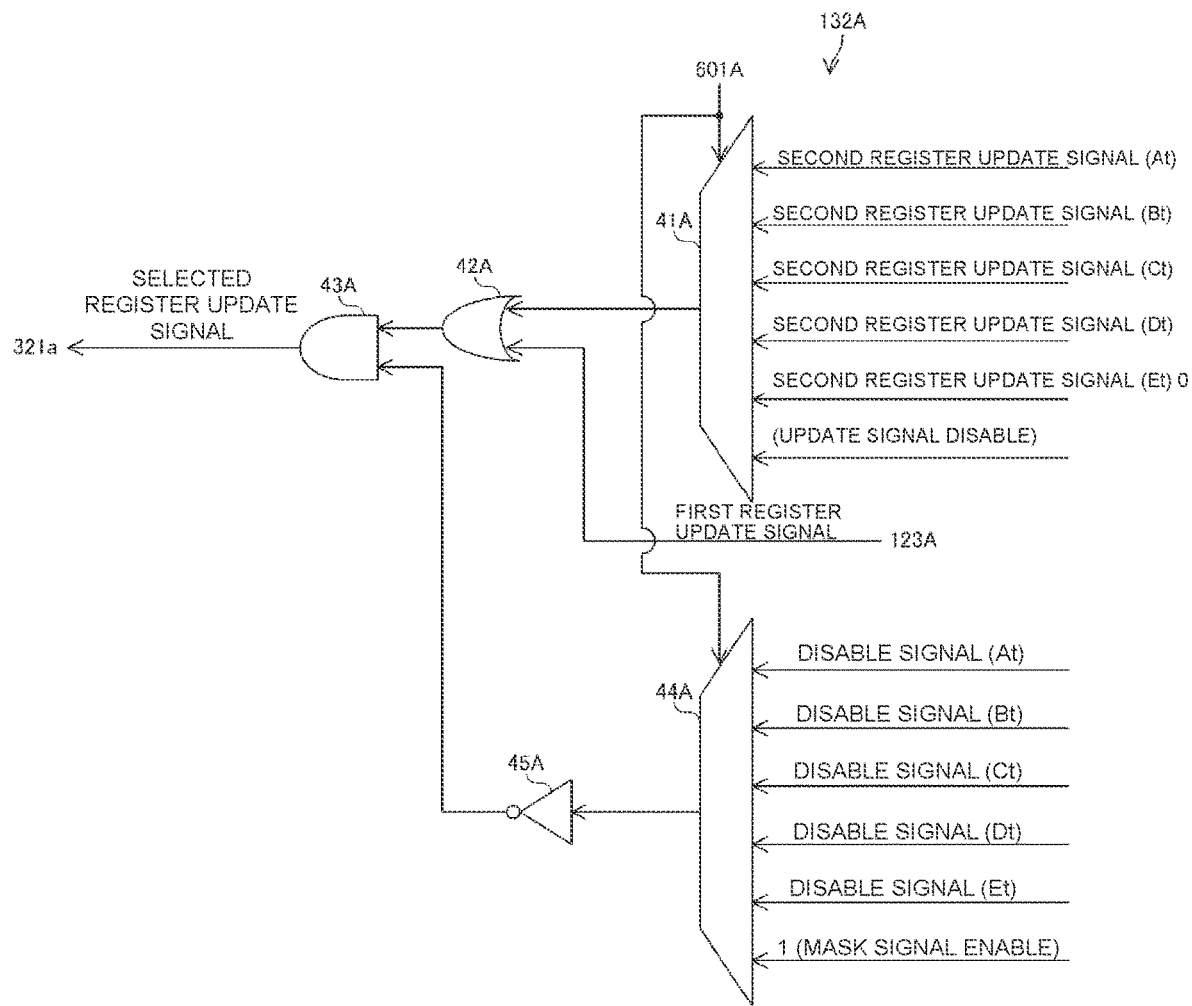
FIG. 14 is a diagram illustrating the configuration of a register update signal selection circuit 132A.

FIG. 14 is a diagram illustrating the configuration of the register update signal selection circuit 132A. As illustrated in FIG. 14, the register update signal selection circuit 132A further includes an AND gate 43A (disabling circuit), a selection circuit 44A (disabling circuit), and a NOT gate 45A (disabling circuit), as compared with the register update signal selection circuit 122A illustrated in FIG. 11.

The selection circuit 44A selects, based on the value held by the first storage circuit 601A, any one of the disable signals (At), (Bt), (Ct), (Dt), and (Et), and outputs the selected signal to the NOT gate 45A.

Specifically, when the value held by the first storage circuit 601A is At, Bt, Ct, Dt, or Et, the selection circuit 44A selects the disable signal (At), (Bt), (Ct), (Dt), or (Et), respectively. The selection circuit 44A outputs a signal having the same level as that of the selected signal to the NOT gate 45A.

When the value held by the first storage circuit 601A is different from any of At, Bt, Ct, Dt, and Et, the selection circuit 44A outputs a signal having the same level as the level of 1 (mask signal enable), that is, a high level, to the NOT gate 45A.

The NOT gate 45A inverts the logical value level of the signal received from the selection circuit 44A and outputs the signal to the AND gate 43A.

The AND gate 43A receives the signal from the OR gate 42A and the signal from the NOT gate 45A and outputs, as a selected register update signal, a signal indicating the logical AND of the signals to the preceding-stage region 321a in the register 321.

For example, when the master 411 selects the timer having the timer identifier At, the timer identifier At is stored in the first storage circuit 601A. Thus, when the disable signal (At) is, for example, at a high level, a high-level signal is supplied from the selection circuit 44A to the NOT gate 45A. In response to being supplied with the high-level signal, the NOT gate 45A outputs a low-level signal to the AND gate 43A. Thus, the selected register update signal is at a low level regardless of the level of the signal from the OR gate 42A.

That is, the selected register update signal is at a low level regardless of the level of the first register update signal from the second circuit 125A that operates as the timer having the timer identifier At and the level of the second register update signal (At).

That is, the first register update signal and the second register update signal (At) are disabled by the disable signal (At). The same applies to a case where the master 411 selects the timer having any one of the timer identifiers Bt, Ct, Dt, and Et.

Figure 15:
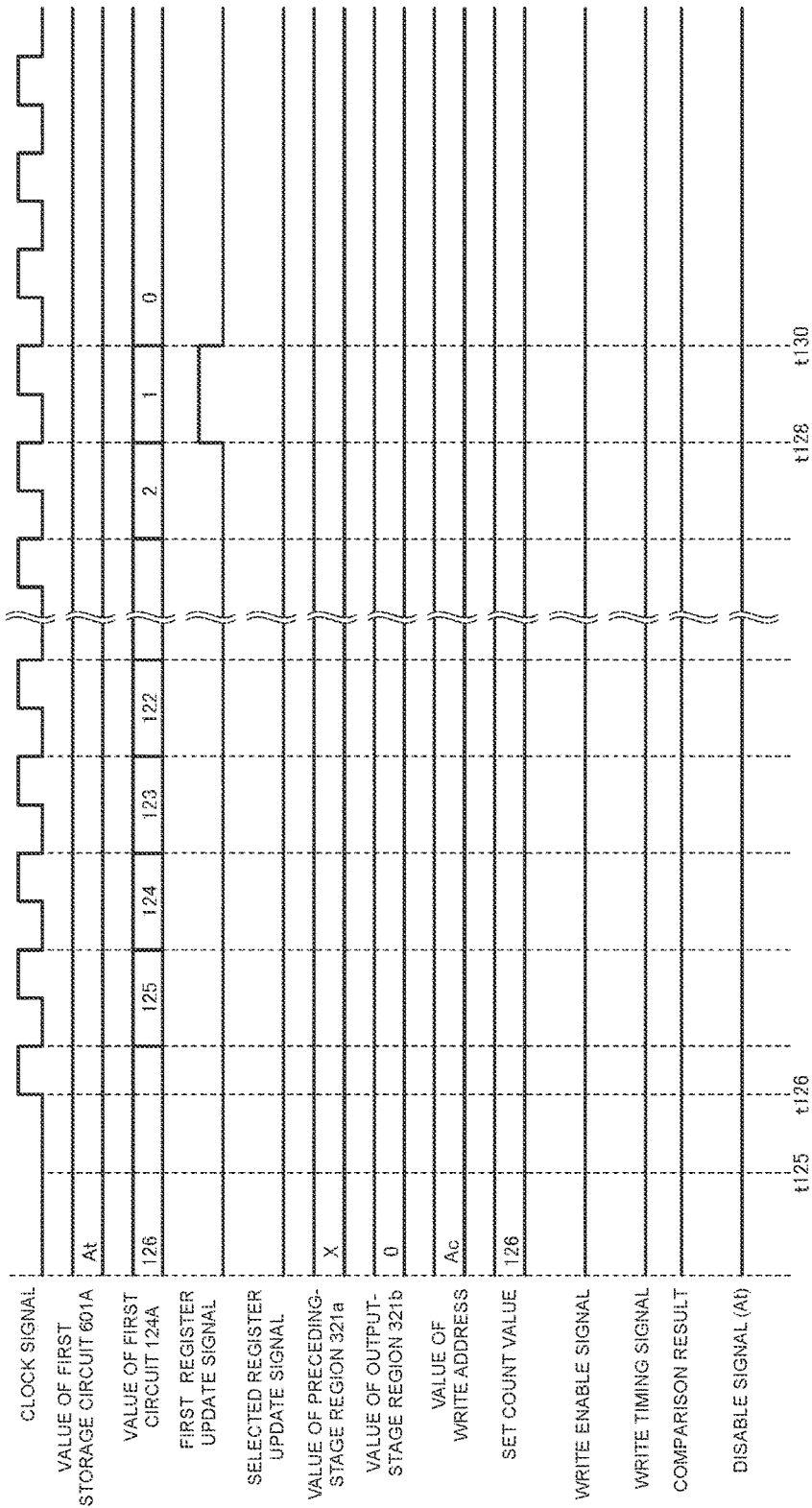
FIG. 15 is a continuation of the time chart illustrated in FIG. 6, and is a modification of the time chart illustrated in FIG. 7.

FIG. 15 is a time chart illustrating the operations of individual circuits in the digital circuit 412. FIG. 15 is a continuation of the time chart illustrated in FIG. 6, and is a modification of the time chart illustrated in FIG. 7. FIG. 15 further illustrates changes in the levels of the selected register update signal and the disable signal (At), as compared with the time chart illustrated in FIG. 7.

As illustrated in FIG. 15, a situation is assumed in which, because the disable signal (At) is set to a high level, the selected register update signal is not at a high level and the register 321 is not updated.

At time t125, which is after time t124 (see FIG. 6) and before time t126, the value held by the first storage circuit 601A and the count value of the first circuit 124A are At and 126, respectively.

As illustrated in FIG. 13 to FIG. 15, from time t126 to time t128, the first circuit 124A decrements the count value for each clock, based on the clock signal SCLK received from the write/read circuit 201.

In addition, from time t126 to time t128, the register update signal generation circuit 123A monitors the count value of the first circuit 124A and outputs a low-level first register update signal indicating that the timer has not expired to the register update signal selection circuit 132A.

Next, the register update signal generation circuit 123A outputs a high-level first register update signal to the register update signal selection circuit 132A during one clock from time t128.

The OR gate 42A in the register update signal selection circuit 132A (see FIG. 14) receives the high-level first register update signal from the register update signal generation circuit 123A and outputs a high-level signal to the AND gate 43A.

The AND gate 43A receives the high-level signal from the OR gate 42A, and also receives a signal obtained by inverting the logical value level of the disable signal (At) by the NOT gate 45A, that is, a low-level signal, from the NOT gate 45A.

Accordingly, the AND gate 43A outputs a selected low-level register update signal to the register 321.

The preceding-stage region 321a in the register 321 does not receive a selected high-level register update signal from the AND gate 43A, and thus the control information held in the preceding-stage region 321a is not transferred to the output-stage region 321b.

(Modifications)

Figure 16:
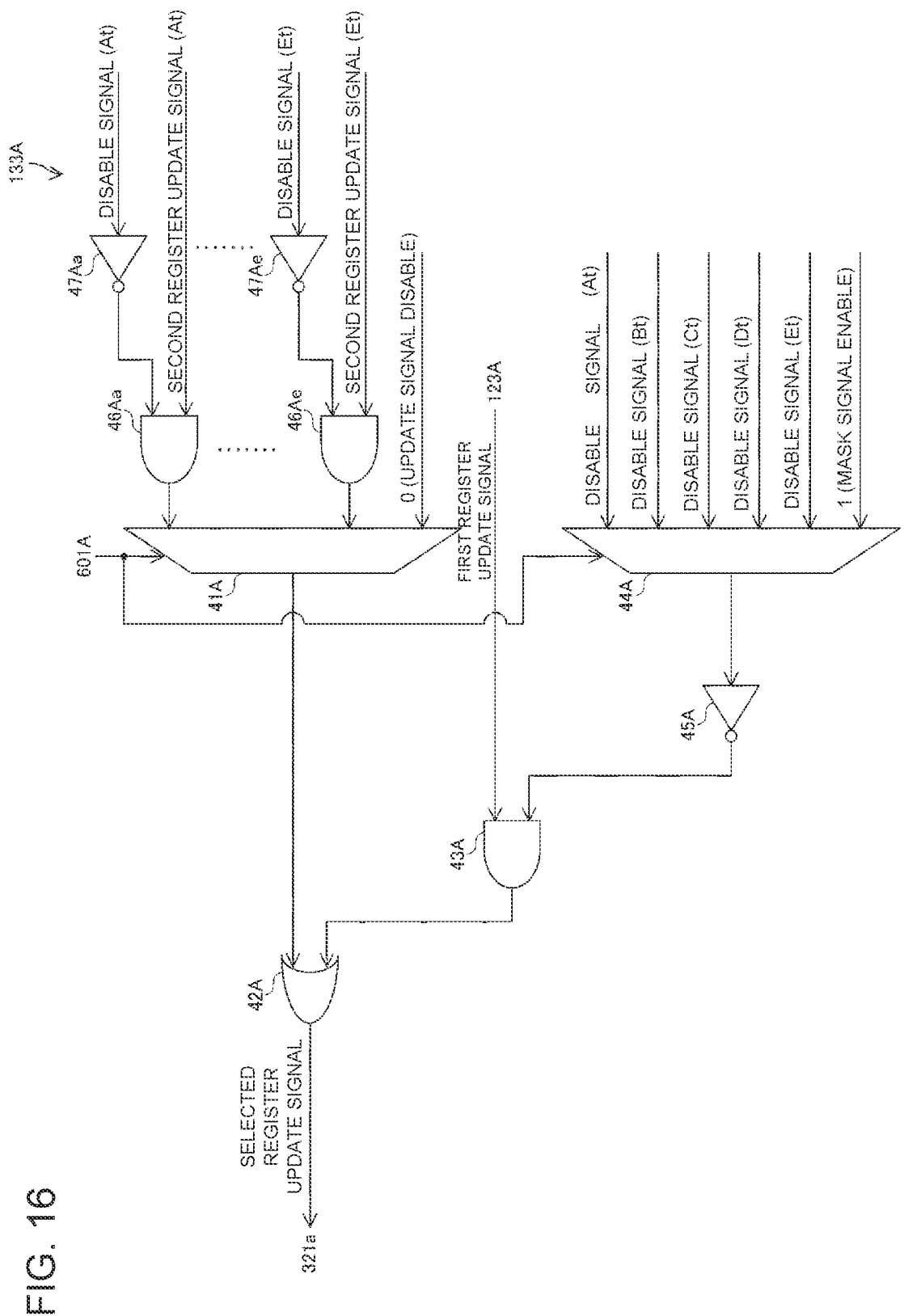
FIG. 16 is a diagram illustrating the configuration of a register update signal selection circuit 133A, which is a modification of the register update signal selection circuit 132A.

FIG. 16 is a diagram illustrating the configuration of a register update signal selection circuit 133A, which is a modification of the register update signal selection circuit 132A. As illustrated in FIG. 16, the register update signal selection circuit 133A is different from the register update signal selection circuit 132A illustrated in FIG. 14 in that a disabling process is performed on each of the second register update signals (At), (Bt), (Ct), (Dt), and (Et) and the first register update signal.

The register update signal selection circuit 133A further includes five AND gates 46Aa to 46Ae and five NOT gates 47Aa to 47Ae, as compared with the register update signal selection circuit 132A illustrated in FIG. 14.

The AND gate 46Aa receives the disable signal (At) supplied through the NOT gate 47Aa and the second register update signal (At), and outputs a signal indicating the logical AND of the signals to the selection circuit 41A.

The AND gates 46Ab (not illustrated) to 46Ae each has a function similar to that of the AND gate 46Aa. The NOT gates 47Ab (not illustrated) to 47Ae each has a function similar to that of the NOT gate 47Aa.

That is, the second register update signals (At), (Bt), (Ct), (Dt), and (Et) are disabled when the disable signals (At), (Bt), (Ct), (Dt), and (Et) are at a high level, respectively. Specifically, when the disable signal (At) is at a high level, the signal output from the AND gate 46Aa is at a low level. The same applies to the levels of signals output from the AND gates 46Ab (not illustrated) to 46Ae.

On the other hand, the second register update signals (At), (Bt), (Ct), (Dt), and (Et) are not disabled when the disable signals (At), (Bt), (Ct), (Dt), and (Et) are at a low level, respectively. Specifically, when the disable signal (At) is at a low level, the signal output from the AND gate 46Aa is at the same level as the second register update signal (At). The same applies to the levels of signals output from the AND gates 46Ab (not illustrated) to 46Ae.

When the value held by the first storage circuit 601A is At, Bt, Ct, Dt, or Et, the selection circuit 41A selects the signal from the AND gate 46Aa, 46Ab, 46Ac, 46Ad, or 46Ae, respectively. The selection circuit 41A outputs a signal having the same level as that of the selected signal to the OR gate 42A.

The AND gate 43A receives the first register update signal supplied from the register update signal generation circuit 123A and the signal supplied from the NOT gate 45A, and outputs a signal indicating the logical AND of the signals to the OR gate 42A.

The OR gate 42A receives the signal from the selection circuit 41A and the signal from the AND gate 43A, and outputs a selected register update signal indicating the logical OR of the signals to the register 321.

Fifth Embodiment

Figure 17:
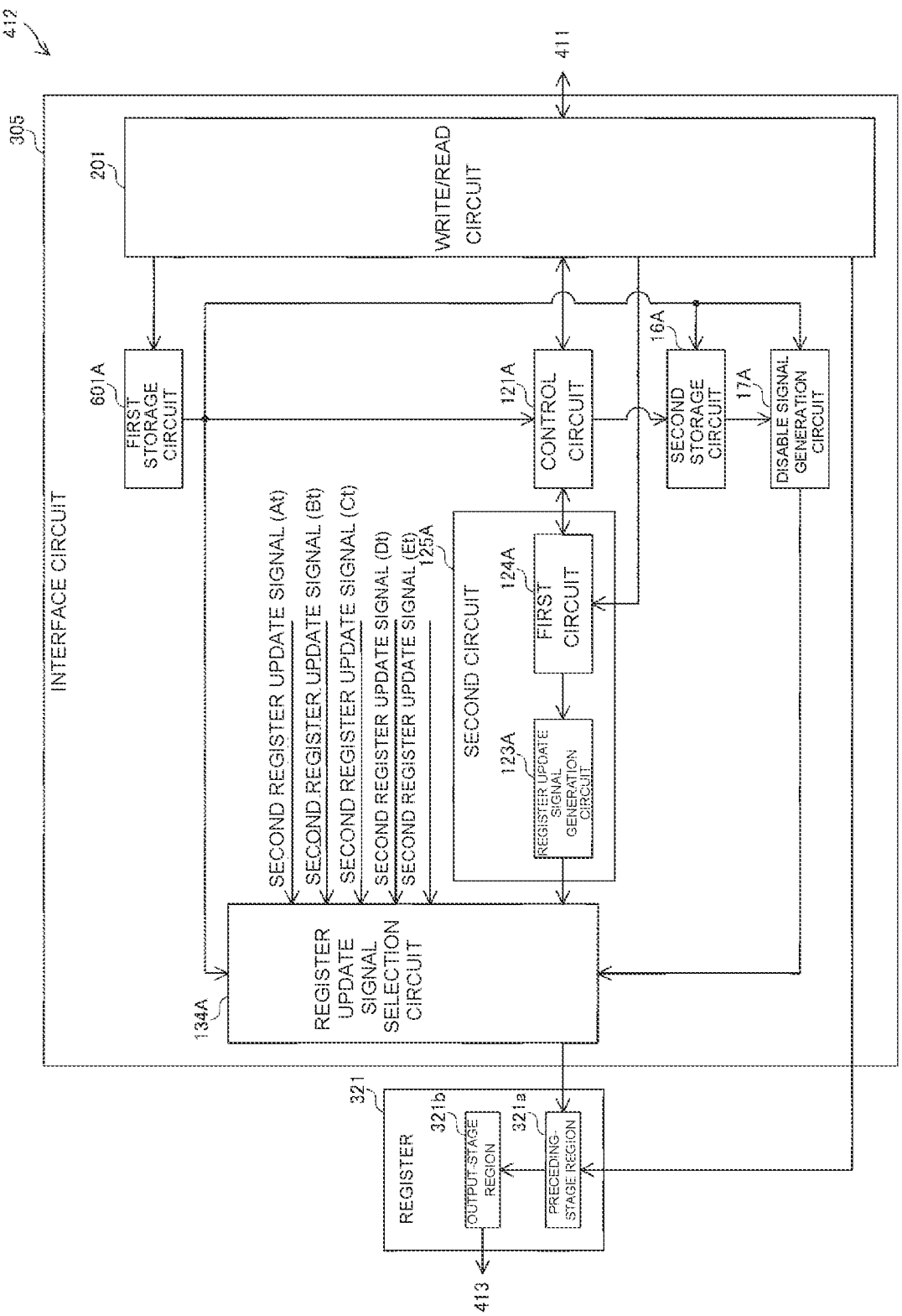
FIG. 17 is a diagram illustrating the configuration of a digital circuit 412 according to a fifth embodiment.

A digital circuit 412 according to a fifth embodiment will be described. FIG. 17 is a diagram illustrating the configuration of the digital circuit 412 according to the fifth embodiment. As illustrated in FIG. 17, the digital circuit 412 according to the fifth embodiment is different from the digital circuit 412 according to the second embodiment in having a function of preventing a first register update signal from being erroneously output when the timer is switched while the second circuit 125A is performing a timer operation.

The digital circuit 412 illustrated in FIG. 17 includes a register update signal selection circuit 134A instead of the register update signal selection circuit 122A, and further includes a second storage circuit 16A and a disable signal generation circuit 17A, as compared with the digital circuit 412 illustrated in FIG. 10.

Figure 18:
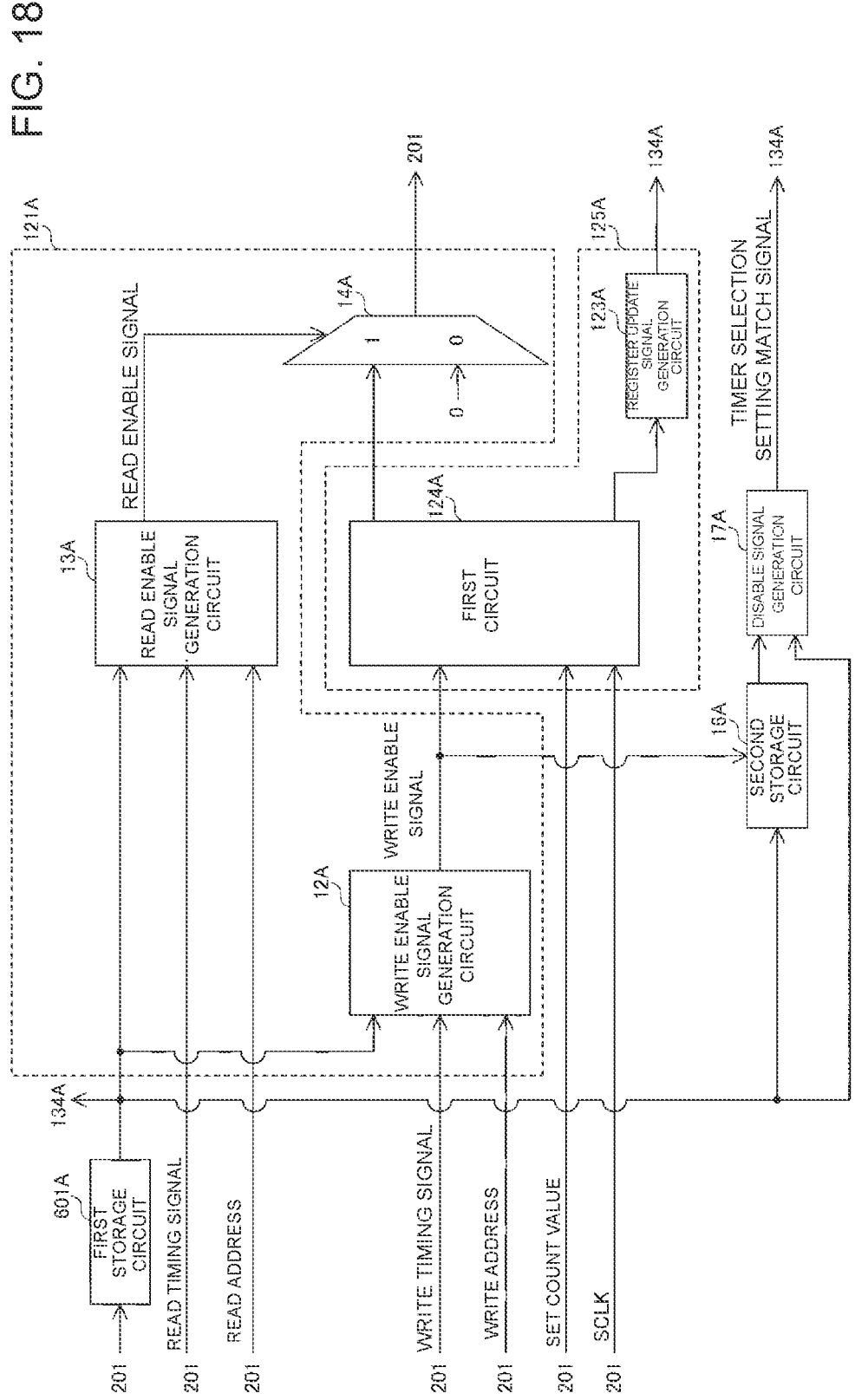
FIG. 18 is a diagram illustrating a detailed configuration of the control circuit 121A and peripheral circuits of the control circuit 121A.

FIG. 18 is a diagram illustrating a detailed configuration of the control circuit 121A and peripheral circuits of the control circuit 121A. As illustrated in FIG. 18, the write enable signal generation circuit 12A in the control circuit 121A outputs a write enable signal to the first circuit 124A and the second storage circuit 16A.

The second storage circuit 16A holds, as second timer selection information, the first timer selection information held by the first storage circuit 601A when write to the first circuit 124A is performed. In the present embodiment, when the write enable signal changes from a low level to a high level, the count value of the first circuit 124A is set to a set count value from the write/read circuit 201, and the value held by the first storage circuit 601A is stored in the second storage circuit 16A.

The disable signal generation circuit 17A is, for example, a comparison circuit. The disable signal generation circuit 17A generates a high-level timer selection setting match signal (disable signal) when the value held by the first storage circuit 601A and the value held by the second storage circuit 16A are the same, and generates a low-level timer selection setting match signal when these values are different from each other. The disable signal generation circuit 17A outputs the generated timer selection setting match signal to the register update signal selection circuit 134A.

Figure 19:
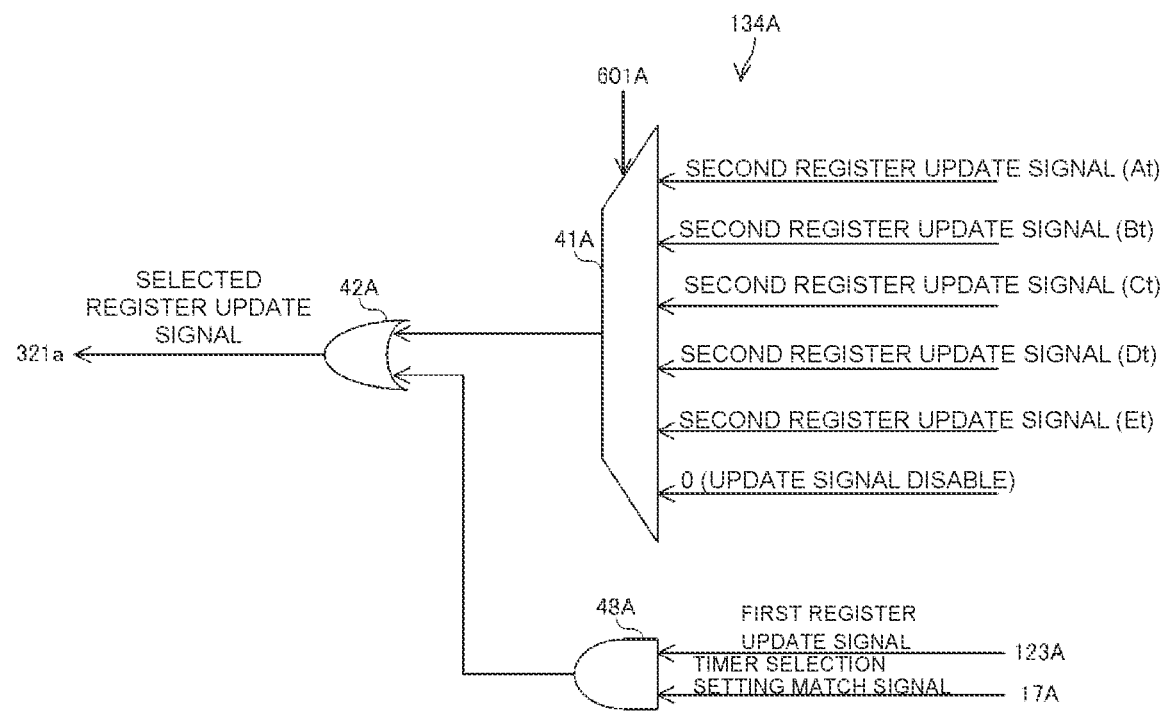
FIG. 19 is a diagram illustrating the configuration of a register update signal selection circuit 134A.

FIG. 19 is a diagram illustrating the configuration of the register update signal selection circuit 134A. As illustrated in FIG. 19, the register update signal selection circuit 134A further includes an AND gate 48A, as compared with the register update signal selection circuit 122A illustrated in FIG. 11.

The AND gate 48A receives the first register update signal supplied from the register update signal generation circuit 123A and the timer selection setting match signal supplied from the disable signal generation circuit 17A, and outputs a signal indicating the logical AND of the signals to the OR gate 42A.

For example, when the value held by the first storage circuit 601A and the value held by the second storage circuit 16A are different from each other, a low-level timer selection setting match signal is input to the AND gate 48A. Thus, the signal output from the AND gate 48A is at a low level regardless of the level of the first register update signal from the register update signal generation circuit 123A.

That is, when the identifier of a current timer (the value held by the first storage circuit 601A) is different from the identifier of the timer when the counter value is set to the first circuit 124A (the value held by the second storage circuit 16A), the first register update signal from the register update signal generation circuit 123A is disabled.

FIG. 20 is a time chart illustrating the operations of individual circuits in the digital circuit 412, and is a modification of the time chart illustrated in FIG. 5. FIG. 21 is a continuation of the time chart illustrated in FIG. 20, and is a modification of the time chart illustrated in FIG. 6. FIG. 22 is a continuation of the time chart illustrated in FIG. 21, and is a modification of the time chart illustrated in FIG. 7.

FIG. 20 to FIG. 22 further illustrate the value of the second storage circuit 16A and changes in the levels of the timer selection setting match signal and the selected register update signal, as compared with the time charts illustrated in FIG. 5 to FIG. 7. Hereinafter, differences from the time charts illustrated in FIG. 5 to FIG. 7 will be mainly described.

As illustrated in FIG. 18 and FIG. 20, at time t110, Et is stored in both the first storage circuit 601A and the second storage circuit 16A.

The write/read circuit 201 sets a write command period Twc1, and rewrites the value held by the first storage circuit 601A from Et to At at time t112 at which the write command period Twc1 ends.

In this case, the write enable signal is at a low level, and thus the value held by the second storage circuit 16A is maintained at Et.

At a timing after time t112, At held by the first storage circuit 601A and Et held by the second storage circuit 16A do not match each other, and thus the disable signal generation circuit 17A outputs a low-level timer selection setting match signal to the register update signal selection circuit 134A.

As illustrated in FIG. 18 and FIG. 21, a high-level write enable signal is supplied to the first circuit 124A and the second storage circuit 16A from time t122 to time t124.

Accordingly, the count value of the first circuit 124A is set to the set count value from the write/read circuit 201, that is, 126, and At held by the first storage circuit 601A is stored in the second storage circuit 16A.

At a timing after time t124, At held by the first storage circuit 601A and At held by the second storage circuit 16A match each other, and thus the disable signal generation circuit 17A outputs a high-level timer selection setting match signal to the register update signal selection circuit 134A.

As illustrated in FIG. 18, FIG. 19, and FIG. 22, the write/read circuit 201 rewrites the value held by the first storage circuit 601A from At to Et at time t127, which is after time t126 and before time t128.

At a timing after time t127, Et held by the first storage circuit 601A and At held by the second storage circuit 16A are different from each other, and thus the disable signal generation circuit 17A outputs a low-level timer selection setting match signal to the register update signal selection circuit 134A.

The register update signal generation circuit 123A monitors the count value of the first circuit 124A, and outputs a low-level first register update signal to the register update signal selection circuit 134A until the count value of the first circuit 124A becomes 1.

Next, the register update signal generation circuit 123A outputs, to the register update signal selection circuit 134A, a high-level first register update signal during one clock from time t128 at which the count value of the first circuit 124A is decremented from 2 to 1.

The AND gate 48A in the register update signal selection circuit 134A (see FIG. 19) is supplied with a high-level first register update signal from the register update signal generation circuit 123A during one clock from time t128, but outputs a low-level signal to the OR gate 42A because the timer selection setting match signal from the disable signal generation circuit 17A is at a low level.

Accordingly, a selected high-level register update signal is not supplied from the OR gate 42A to the register 321. Thus, in the register 321, X held in the preceding-stage region 321a is not transferred to the output-stage region 321b.

That is, at a timing before time t127 (see FIG. 22), the counter having the write address Ac is counting down as the counter used for the timer having the timer identifier At.

At time t127, the timer used by the master 411 is changed from the timer having the timer identifier At to the timer having the timer identifier Et.

With the configuration of an interface circuit 305, even when the count value of the counter having the write address Ac becomes zero, a selected register update signal can be maintained at a low level. This makes it possible to prevent control information X from being erroneously transferred to the RF analogue circuit 413 at a timing unexpected by the master 411, for example, at time t130.

Exemplary embodiments of the present disclosure have been described above. In the interface circuit 301, the first storage circuit 601A holds first timer selection information indicating which of a plurality of timers is to be selected. The second circuit 125A includes the first circuit 124A that performs a counter operation, and the register update signal generation circuit 123A that outputs, based on an output of the first circuit 124A, a first register update signal for updating the register 321. The second circuit 125A is capable of operating as any one of the plurality of timers. The control circuit 121A controls, based on the first timer selection information from the first storage circuit 601A and counter identification information that is received from the master 411 and that indicates any one of a plurality of counters associated with the plurality of timers, whether to enable or disable write to the first circuit 124A or read from the first circuit 124A.

With this configuration, which of the plurality of timers is selected can be recognized based on the first timer selection information. In addition, the master 411 is capable of recognizing, based on the counter identification information, which of the plurality of counters associated with the plurality of timers is selected. As a result of controlling whether to enable or disable write to the first circuit 124A or read from the first circuit 124A based on the first timer selection information and the counter identification information, the first circuit 124A and the second circuit 125B can be operated as a selected counter and a selected timer, respectively. That is, the interface circuit 301 including only one second circuit 125A and one first circuit 124A can be operated as an interface circuit including a plurality of timers and a plurality of counters associated with the plurality of timers. In this way, the number of timers and the number of counters can each be reduced to one, and thus the circuit scale can be reduced.

In the interface circuit 302, the register update signal selection circuit 122A selects and outputs one signal from among the first register update signal and a plurality of second register update signals different from the first register update signal.

With this configuration, the register 321 can be updated at the timing at which the second register update signal is output as well as the timing at which the first register update signal is output from the register update signal generation circuit 123A.

In the interface circuit 301, the write/read circuit 201 writes, based on setting information that is received from the master 411 and that indicates a set count value to be written to the first circuit 124A, the set count value to the first circuit 124A.

With this configuration in which the set count value received from the master 411 is written to the first circuit 124A, it is possible to implement a configuration in which the time until the register 321 is updated is set from the master 411.

In the interface circuit 301, the write/read circuit 201 outputs, in response to the control circuit 121A enabling read from the first circuit 124A, count information indicating a count value of the first circuit 124A to the master 411.

With this configuration, the master 411 can be notified of the count value of the first circuit 124A, and thus the master 411 is capable of recognizing the time until the register 321 is updated.

The interface circuit 303 includes a plurality of sets of a first storage circuit, a second circuit, and a control circuit. The output circuit outputs, to the write/read circuit 201, the count information from the first circuit included in any one of the plurality of sets.

With this configuration, a plurality of second circuits can be caused to simultaneously perform a timer operation, and thus the master 411 is capable of simultaneously using a plurality of timers. Also in a configuration in which a plurality of first circuits 124A are provided in the interface circuit 303, the master 411 can be notified of the count value of each first circuit 124A.

In the interface circuit 304, the register update signal selection circuit 132A selects one of a plurality of disable signals for disabling the first register update signal and disables the first register update signal.

With this configuration, for example, when a plurality of disable signals are respectively associated with a plurality of timers, the first register update signal from the second circuit 125A that operates as a selected timer can be disabled by the disable signal associated with the timer.

In the interface circuit 305, the second storage circuit 16A holds, as second timer selection information, the first timer selection information held by the first storage circuit 601A when write to the first circuit 124A is performed. The disable signal generation circuit 17A generates, based on the first timer selection information and the second timer selection information, a disable signal when contents indicated by the first timer selection information are different from contents indicated by the second timer selection information.

With this configuration, the timer is switched when the second circuit 125A is performing a timer operation, and the timer selected when write to the first circuit is performed is different from the currently selected timer. Thus, a disable signal can be generated when the contents of the first timer selection information are different from the contents of the second timer selection information. Accordingly, it is possible to prevent the first register update signal from being output and the register 321 from being erroneously updated even though the currently selected timer has not expired.

The above-described embodiments are intended to facilitate understanding of the present disclosure, and are not intended to be construed as limiting the present disclosure. The present disclosure can be modified or improved without necessarily departing from the gist thereof, and equivalents thereof are also included in the present disclosure. That is, those skilled in the art can appropriately modify the design of each embodiment, and such modifications are included in the scope of the present disclosure as long as the modifications have features of the present disclosure. For example, the elements included in each embodiment, and the arrangement, materials, conditions, shapes, sizes, and so forth thereof are not limited to those illustrated and can be appropriately changed. Each embodiment is an example, and it is needless to say that partial replacement or combination of configurations illustrated in different embodiments is possible. The partial replacement or combination is also included in the scope of the present disclosure as long as it has features of the present disclosure.

REFERENCE SIGNS LIST

12A write enable signal generation circuit
13A read enable signal generation circuit
14A selection circuit
16A second storage circuit
17A disable signal generation circuit
41A selection circuit
42A OR gate
43A AND gate
44A selection circuit
45A NOT gate
46Aa, 46Ae AND gate
47Aa, 47Ae NOT gate
48A AND gate
115 OR gate
121A, 121B control circuit
122A register update signal selection circuit
123A, 123B register update signal generation circuit
124A, 124B first circuit
125A, 125B second circuit
132A, 133A, 134A register update signal selection circuit
201 write/read circuit
301, 302, 303, 304, 305 interface circuit
321, 322 register
401 communication module
411 master
412 digital circuit
413 RF analog circuit
501 communication device
601A, 601B first storage circuit

The invention claimed is:

1. An interface circuit comprising:
a first storage circuit configured to hold first timer selection information indicating which of a plurality of timers is selected;
a second circuit comprising:
a first circuit configured to perform a counter operation, and
a register update signal generation circuit configured to output, based on an output of the first circuit, a first register update signal for updating a register,
the second circuit being configured to operate as any one of the plurality of timers;
a control circuit configured to, based on the first timer selection information from the first storage circuit and counter identification information that is received from an external device and that indicates any one of a plurality of counters associated with the plurality of timers, enable or disable writing to the first circuit or reading from the first circuit; and
a register update signal selection circuit configured to select and to output one signal from the first register update signal and a plurality of second register update signals different from the first register update signal.

2. The interface circuit according to claim 1, further comprising:

a write circuit configured to write, based on setting information that is received from the external device and that indicates a set count value, the set count value to the first circuit.

3. The interface circuit according to claim 1, further comprising:
a read circuit configured to output, in response to the control circuit enabling reading from the first circuit, count information that indicates a count value of the first circuit to the external device.

4. The interface circuit according to claim 3,
wherein the interface circuit comprises a plurality of sets of the first storage circuit, the second circuit, and the control circuit, and
wherein the interface circuit further comprises an output circuit configured to output, to the read circuit, the count information from the first circuit in any one of the plurality of sets.

5. The interface circuit according to claim 1, further comprising:
a disabling circuit configured to select one of a plurality of disable signals, and to disable the first register update signal based on the selected disable signal.

6. The interface circuit according to claim 1, further comprising:
a second storage circuit configured to hold, as second timer selection information, the first timer selection information held by the first storage circuit when the first circuit is written to; and
a disable signal generation circuit configured to generate, based on the first timer selection information and the second timer selection information, a disable signal when contents indicated by the first timer selection information are different from contents indicated by the second timer selection information.

7. A digital circuit comprising:
the interface circuit according to claim 1; and
the register, the register being configured to hold control information for a control target circuit that is controlled by the external device, and configured to output, based on the first register update signal, the control information to the control target circuit.

8. A communication module comprising:
the digital circuit according to claim 7;
the external device; and
the control target circuit.

9. A communication device comprising:
the communication module according to claim 8.

\* \* \* \* \*